(12) United States Patent
Takahashi et al.

(10) Patent No.: US 11,617,247 B2
(45) Date of Patent: Mar. 28, 2023

(54) LIGHTING CIRCUIT FOR AUTOMOTIVE LAMP

(71) Applicant: KOITO MANUFACTURING CO., LTD., Tokyo (JP)

(72) Inventors: Norito Takahashi, Shizuoka (JP); Satoshi Kikuchi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/398,036

(22) Filed: Aug. 10, 2021

(65) Prior Publication Data

US 2021/0368603 A1  Nov. 25, 2021

Related U.S. Application Data

(63) Continuation of application No. PCT/JP2020/004358, filed on Feb. 5, 2020.

(30) Foreign Application Priority Data

Feb. 13, 2019 (JP) .............................. JP2019-023358
Feb. 13, 2019 (JP) .............................. JP2019-023359

(51) Int. Cl.
*H05B 45/30* (2020.01)
*H05B 45/3725* (2020.01)
(Continued)

(52) U.S. Cl.
CPC ....... *H05B 45/3725* (2020.01); *H05B 45/305* (2020.01); *H05B 45/325* (2020.01);
(Continued)

(58) Field of Classification Search
CPC ........ H05B 45/14; H05B 45/38; H05B 45/46; H05B 45/58; H05B 45/305; H05B 45/325;
(Continued)

(56) References Cited

U.S. PATENT DOCUMENTS

| 2008/0122383 A1* | 5/2008 | Katoh | H05B 45/46 315/291 |
| 2008/0278092 A1* | 11/2008 | Lys | H05B 45/385 315/247 |

(Continued)

FOREIGN PATENT DOCUMENTS

| JP | 2018102053 A | 6/2018 |
| JP | 2018129907 A | 8/2018 |

(Continued)

OTHER PUBLICATIONS

International Search Report for corresponding PCT Application No. PCT/JP2020/004358; dated Mar. 17, 2020—4 pages.

(Continued)

*Primary Examiner* — Tung X Le
(74) *Attorney, Agent, or Firm* — Buchanan Ingersoll & Rooney PC

(57) ABSTRACT

Multiple current sources are coupled in series to corresponding light-emitting elements. Switching converter supplies driving voltage to the multiple light-emitting elements and current sources. Pulse modulator generates pulse signal that transits to on level when the smallest from among voltages across both ends of the multiple current sources falls to bottom limit voltage, and subsequently transits to off level. Frequency stabilization circuit controls pulse modulator such that the frequency of pulse signal approaches its target. Dummy load circuit is configured to lower driving voltage in the enable state, to be set to the enable state when switching transistor continues to be off for a predetermined time, and to be set to the disable state in response to the next turn-on of the switching transistor.

16 Claims, 26 Drawing Sheets

(51) Int. Cl.
*H05B 45/345* (2020.01)
*H05B 45/305* (2020.01)
*H05B 45/325* (2020.01)
*H05B 45/3575* (2020.01)
*B60Q 1/04* (2006.01)

(52) U.S. Cl.
CPC ....... *H05B 45/345* (2020.01); *H05B 45/3575* (2020.01); *B60Q 1/04* (2013.01)

(58) Field of Classification Search
CPC . H05B 45/345; H05B 45/395; H05B 45/3725
See application file for complete search history.

(56) References Cited

U.S. PATENT DOCUMENTS

| | | | |
|---|---|---|---|
| 2009/0187925 A1* | 7/2009 | Hu | H05B 45/46 719/327 |
| 2010/0328370 A1* | 12/2010 | Takata | H05B 45/46 315/210 |
| 2011/0068706 A1 | 3/2011 | Otake et al. | |
| 2012/0146531 A1 | 6/2012 | Uchimoto et al. | |
| 2014/0266084 A1 | 9/2014 | Fan et al. | |
| 2014/0292220 A1* | 10/2014 | Trattler | H05B 45/46 323/283 |
| 2015/0280557 A1 | 10/2015 | Xue et al. | |
| 2016/0381748 A1 | 12/2016 | Hagino | |
| 2017/0188433 A1* | 6/2017 | Chen | H05B 45/395 |
| 2018/0092172 A1* | 3/2018 | Yoo | H05B 45/46 |
| 2018/0160516 A1* | 6/2018 | Kwak | H05B 41/282 |

FOREIGN PATENT DOCUMENTS

| | | |
|---|---|---|
| WO | 2017022633 A | 2/2017 |
| WO | 2019098138 A1 | 5/2019 |

OTHER PUBLICATIONS

International Preliminary Examination Report on Patentability with Written Opinion of ISA with an English translation dated Aug. 10, 2021. 11 Pages.

Extended European Search Report issued in corresponding European Patent Application No. 20 75 5918, dated Feb. 24, 2022 (9 pages).

* cited by examiner

FIG. 26
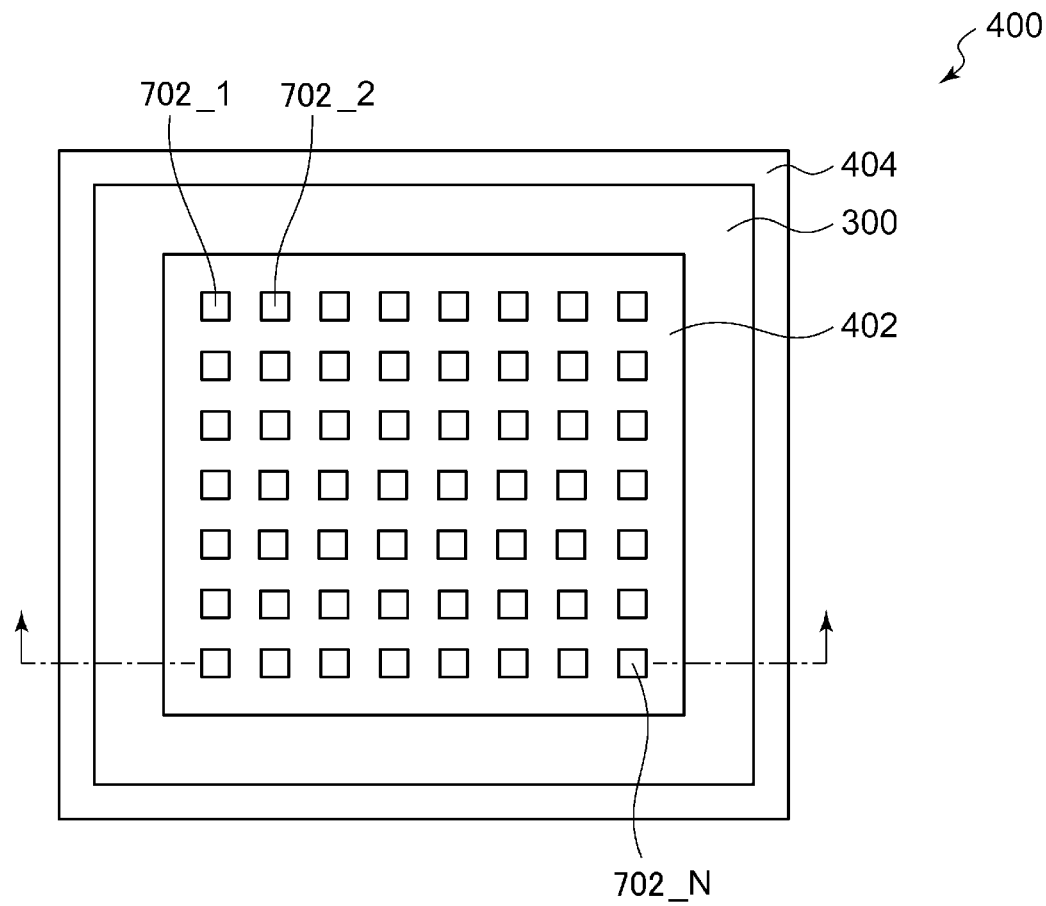
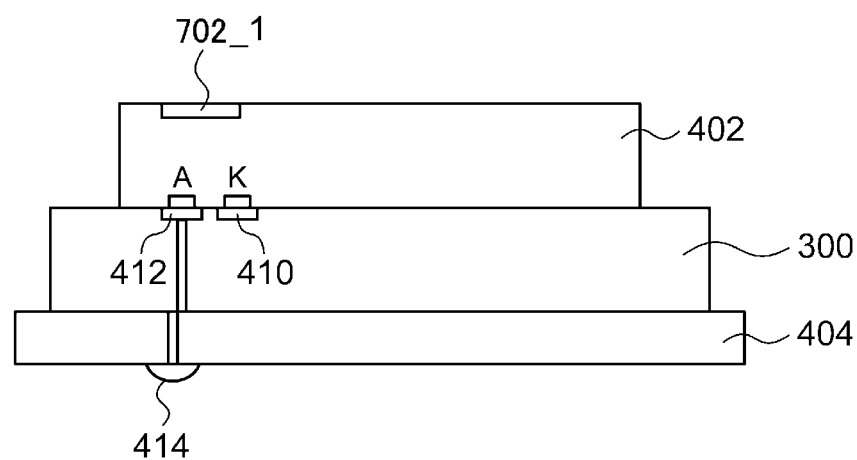

LIGHTING CIRCUIT FOR AUTOMOTIVE LAMP

BACKGROUND

1. Technical Field

The present invention relates to control of a DC/DC converter.

2. Description of the Related Art

As a control method for a DC/DC converter, a ripple regulator control such as a hysteresis control (Bang-Bang control) method, bottom detection on-time fixed control method, peak detection off-time fixed control method, etc., is known. With ripple regulator control, there is no feedback loop including an error amplifier, and in principle there is a small delay. Accordingly, ripple regulator control is employed in an application that requires high-speed responsivity.

With ripple regulator control, the switching frequency changes according to the load or the input voltage. In in-vehicle devices, the frequency of electromagnetic noise is regulated, leading to a problem in that it is difficult to employ ripple regulator control. In order to solve this problem, ripple regulator control has been proposed including a loop for feedback control of the on time such that the switching frequency approaches a target frequency (See Patent document 1: International Publication WO 2017/022633).

FIG. 1 is a block diagram showing a switching power supply in which frequency stabilization control is incorporated. A switching power supply 500R includes a step-down converter 510 and a control circuit (converter controller) 520R thereof. The step-down converter 510 supplies a control signal (driving voltage $V_{OUT}$ or driving current $I_{OUT}$) to a load 502. The control circuit 520R receives a feedback signal $V_{FB}$ indicative of the electrical state of the load 502 to be controlled.

The control circuit 520R employs a modification of the bottom detection on-time fixed control method. Specifically, when the feedback signal $V_{FB}$ decreases to a predetermined bottom threshold value $V_K$, the control circuit 520R turns on a switching transistor 512 of the step-down converter 510. After the elapse of on time $T_{ON}$, the control circuit 520R turns off the switching transistor 512. The control circuit 520R monitors the switching frequency of the switching transistor 512, and feedback controls the on time $T_{ON}$ such that the switching frequency approaches a predetermined target frequency.

A comparator 522 compares the feedback signal $V_{FB}$ with the bottom threshold value $V_K$, and generates a turn-on signal $S_{ON}$ that is asserted (set to a high level, for example) when $V_{FB} < V_K$. A pulse generator 524 generates a pulse signal $S_P$ that is set to an on level (e.g., high level) during the on time $T_{ON}$ from the assertion of the turn-on signal $S_{ON}$, and that subsequently transits to an off level (e.g., low level). A driver 526 generates a gate signal $S_G$ based on the pulse signal $S_P$, so as to drive the switching transistor 512.

A frequency detector 528 monitors the pulse signal $S_P$ or the output signal $S_G$ of the driver 526, and generates a frequency detection signal $V_{FREQ}$ indicative of the frequency of the pulse signal $S_P$ or the output signal $S_G$ of the driver 526. An on-time adjustment unit 530 adjusts the on time $T_{ON}$ of the pulse generator 524 such that the frequency detection signal $V_{FREQ}$ approaches a predetermined target level $V_{FREQ(REF)}$.

FIG. 2 is an operation waveform diagram showing the operation of the switching power supply 500R shown in FIG. 1. In a period in which the pulse signal $S_P$ is set to the high level, the switching transistor 512 is turned on, and the feedback signal $V_{FB}$ increases. Conversely, during a period in which the pulse signal $S_P$ is set to the low level, the switching transistor 512 is turned off, and the feedback signal $V_{FB}$ decreases. The rate of decrease of the feedback signal $V_{FB}$ changes depending on the output current $I_{OUT}$. The rate of increase of the feedback signal $V_{FB}$ depends on the input voltage $V_{IN}$. In this waveform diagram, the delay of the comparator 522 is ignored.

FIG. 2 shows a situation in which the rate of decrease changes depending on the output current $I_{OUT}$. In contrast, the rate of increase of the feedback signal $V_{FB}$ is maintained so as to be constant. As the rate of decrease of the feedback signal $V_{FB}$ becomes slower according to a decease in the output current $I_{OUT}$, the on time $T_{ON}$ is feedback controlled such that it becomes shorter, thereby stabilizing the switching frequency $T_P$.

As a result of investigating a converter in which frequency stabilization control is implemented, the present inventors have recognized the following problems.

Problem 1

FIG. 3 is a diagram for explaining a limit of the frequency stabilization control. The on time of the pulse signal $S_P$ cannot become smaller than a given minimum width $T_{ON(MIN)}$ due to the response delay of the comparator 522 or the pulse generator 524. The solid line (i) indicates the operation in which the on time of the pulse signal $S_P$ becomes its minimum width.

When the output current $I_{OUT}$ becomes smaller than that indicated by the solid line (i), the slope of the decreasing slope of the feedback signal $V_{FB}$ becomes even smaller. With an ideal arrangement in which the pulse width of the pulse signal $S_P$ can become smaller than the minimum width $T_{ON(MIN)}$ as indicated by the broken line (ii), such an arrangement is capable of maintaining the frequency $T_P$ so as to be constant. However, in actuality, as indicated by the line of alternately long and short dashes (iii), the pulse width of the pulse signal $S_P$ is limited to the on time $T_{ON(MIN)}$. Accordingly, the switching period $T_{P'}$ is longer than the ideal period $T_P$. As described above, the frequency stabilization control has a limit.

The same problem also occurs in a case in which the input voltage $V_{IN}$ changes.

Problem 2

As a result of investigating a converter in which the frequency stabilization control is implemented, the present inventors have recognized the following problem.

FIG. 4 is a waveform diagram showing a start-up operation of the switching power supply 500R shown in FIG. 1. For simplification of description, description will be made below regarding an arrangement in which $V_{OUT} = V_{FB}$. At the time point $t_0$, a power supply for the switching power supply 500R is turned on, which instructs the switching power supply 500R to start up. At a stage immediately after the start-up operation, the output voltage $V_{OUT}$ is low, leading to a state in which $V_{FB} < V_{BOTTOM}$. According to this state, the turn-on signal $S_{ON}$ transits to the high level, which turns on the switching transistor 512. In a case in which the frequency stabilization control is applied, the on time $T_{ON}$ is shorter than the target period. During the limited on time $T_{ON}$, the output voltage $V_{OUT}$ (feedback voltage $V_{FB}$) increases slightly. However, the feedback signal $V_{FB}$ cannot exceed the bottom limit voltage $V_{BOTTOM}$ ($V_{FB} < V_{BOTTOM}$). When the switching transistor is turned off at the time point $t_1$, the feedback signal $V_{FB}$ decreases. Accordingly, the state $V_{FB} < V_{BOTTOM}$ is maintained, which maintains the turn-on signal $S_{ON}$ at the high level. The pulse generator 524 is configured to switch the pulse signal $S_P$ to the on level in response to the transition (positive edge) of the turn-on signal $S_{ON}$. However, when the turn-on signal is fixed to the high level, the switching of the switching transistor 512 stops.

In order to solve this problem, Patent document 1 discloses a technique in which an OR gate is inserted as an upstream stage of the driver 526 so as to generate a logical OR of the turn-on signal $S_{ON}$ and the pulse signal $S_P$.

This technique is capable of preventing the switching from stopping immediately after the start-up operation. However, in some cases, such an arrangement has a problem in that the frequency stabilization control cannot operate properly depending on the target value of the switching frequency. Specifically, in a situation in which the target value of the switching frequency is set to a high value (the target vale of the switching period is set to a short value), the on time $T_{ON}$ is also set to a small value. In this case, the pulse width of the turn-on signal $S_{ON}$ becomes longer than the pulse width (i.e., the on time $T_{ON}$) of the pulse signal $S_P$ generated by the pulse generator 524. Accordingly, the pulse width of the pulse signal $S_{P'}$ to be used for the driving is defined prioritizing the pulse width of the turn-on signal $S_{ON}$, leading to a problem in that the frequency control becomes ineffective. That is to say, with such a conventional technique, there is a limit on the target value of the switching frequency.

SUMMARY

An embodiment of the present invention has been made in view of the problem 1.

Another embodiment of the present invention has been made in view of the problem 2.

1. An embodiment of the present disclosure relates to a lighting circuit configured to turn on multiple light-emitting elements. The lighting circuit includes: multiple current sources each to be coupled in series to the corresponding light-emitting elements; a step-down switching converter configured to supply a driving voltage across each of multiple series connection circuits formed of the multiple light-emitting elements and the multiple current sources; a ripple-control converter controller configured to control a switching transistor of the switching converter such that the voltage across one of the multiple current sources approaches its target voltage and such that the frequency of the switching transistor approaches its target frequency; and a dummy load circuit configured to decrease the driving voltage in the enable state, to be set to the enable state when the off state of the switching transistor continues for a predetermined time, and to be set to the disable state in response to the next turn-on of the switching transistor.

Another embodiment of the present disclosure relates to a control circuit for a step-down converter including a switching transistor. The control circuit includes: a comparator configured to compare a feedback signal indicative of the electrical state of the step-down converter or the load thereof with a bottom limit voltage; a pulse generator configured to generate a pulse signal that transits to the on level in response to a turn-on signal based on the output of the comparator, and that transits to the off level after the on time elapses; a frequency stabilization circuit configured to adjust the on time such that the frequency of the pulse signal approaches the target frequency; and a dummy load circuit configured to forcibly decrease the output voltage of the step-down converter in the enable state, to be set to the enable state when the off state of the switching transistor continues for a predetermined time, and to be set to the disable state in response to the next turn-on of the switching transistor.

Yet another embodiment of the present disclosure also relates to a control circuit for a step-down converter including a switching transistor. The control circuit includes: a comparator configured to compare a feedback signal indicative of the electrical state of the step-down converter or the load thereof with a bottom limit voltage; a pulse generator configured to generate a pulse signal that transits to the on level in response to a turn-on signal based on the output of the comparator, and that transits to the off level after the on time elapses; a frequency stabilization circuit configured to adjust the on time such that the frequency of the pulse signal approaches the target frequency; and a selector configured to switch between (i) the first mode in which the switching transistor is driven according to the pulse signal and (ii) the second mode in which the switching transistor is driven according to the turn-on signal in a state in which the pulse generator is bypassed.

2. An embodiment of the present disclosure relates to a lighting circuit configured to turn on multiple light-emitting elements. The lighting circuit includes multiple current sources to be respectively coupled in series to corresponding light-emitting elements; a step-down switching converter configured to supply a driving voltage across both ends of each of multiple series connection circuits formed of the multiple light-emitting elements and the multiple current sources; a pulse modulator configured to generate a turn-on signal indicative of a result of comparison between a bottom limit voltage and a smallest voltage from among voltages across the multiple current sources, and to generate a pulse signal that transits to an on level in response to the turn-on signal, and that subsequently transits to an off level; and a frequency stabilization circuit configured to control the pulse modulator such that the frequency of the pulse signal approaches a target frequency. In the first mode, a switching transistor of the switching converter is driven according to the pulse signal. In the second mode, the switching transistor is driven according to the turn-on signal.

Another embodiment of the present disclosure relates to a control circuit for a switching converter including a switching transistor. The control circuit includes: a pulse modulator that includes a comparator configured to compare a feedback signal indicative of an electrical state of the switching converter or a load of the switching converter with a bottom limit voltage, and that is configured to generate a pulse signal that transits to an on level in response to a turn-on signal based on an output of the comparator; a frequency stabilization circuit configured to control the pulse modulator such that the frequency of the pulse signal approaches a target frequency; a mode selector configured to generate a mode selection signal according to an operating state of the switching converter; a multiplexer configured to receive the pulse signal and the turn-on signal, to select the pulse signal when the mode selection signal indicates the first mode, and to select the turn-on signal when the mode signal indicates the second mode; and a driver configured to drive the switching transistor according to an output of the multiplexer.

It should be noted that any combination of the components described above, any component of the present disclosure, or any manifestation thereof, may be mutually substituted between a method, apparatus, system, and so forth, which are also effective as an embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 26 shows a plan view and a cross-sectional view of a light source with an integrated driver;

DETAILED DESCRIPTION

Figure 1:
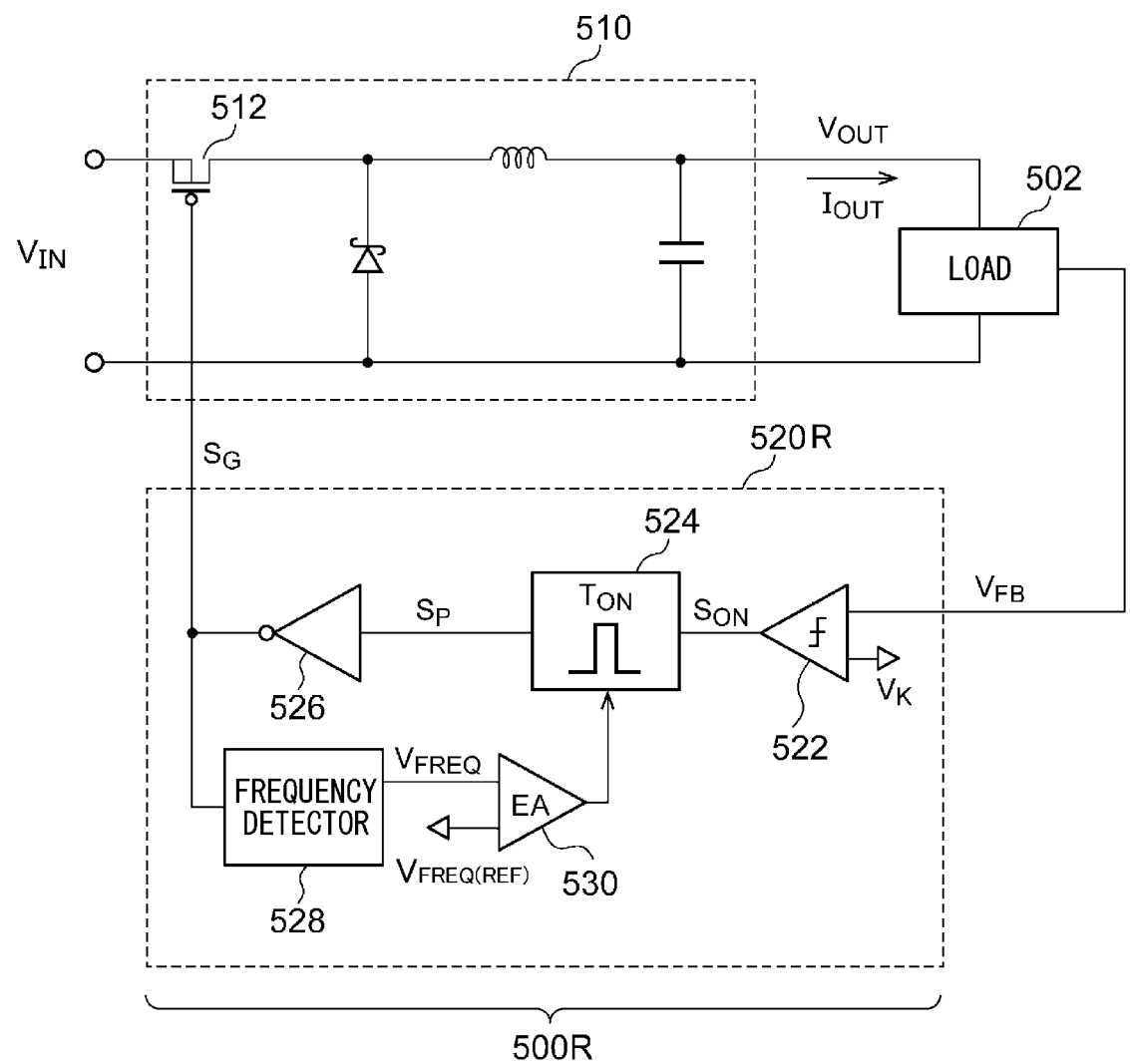
FIG. 1 is a block diagram showing a switching power supply provided with a function of frequency stabilization control.
Figure 2:
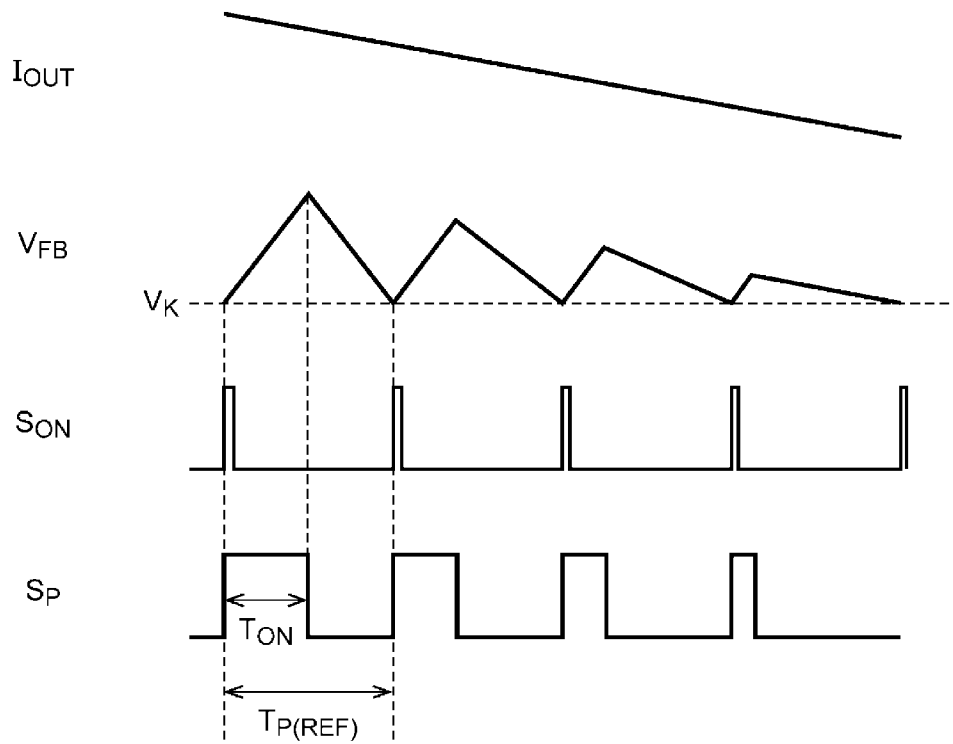
FIG. 2 is an operation waveform diagram showing the operation of the switching power supply shown in FIG. 1.
Figure 3:
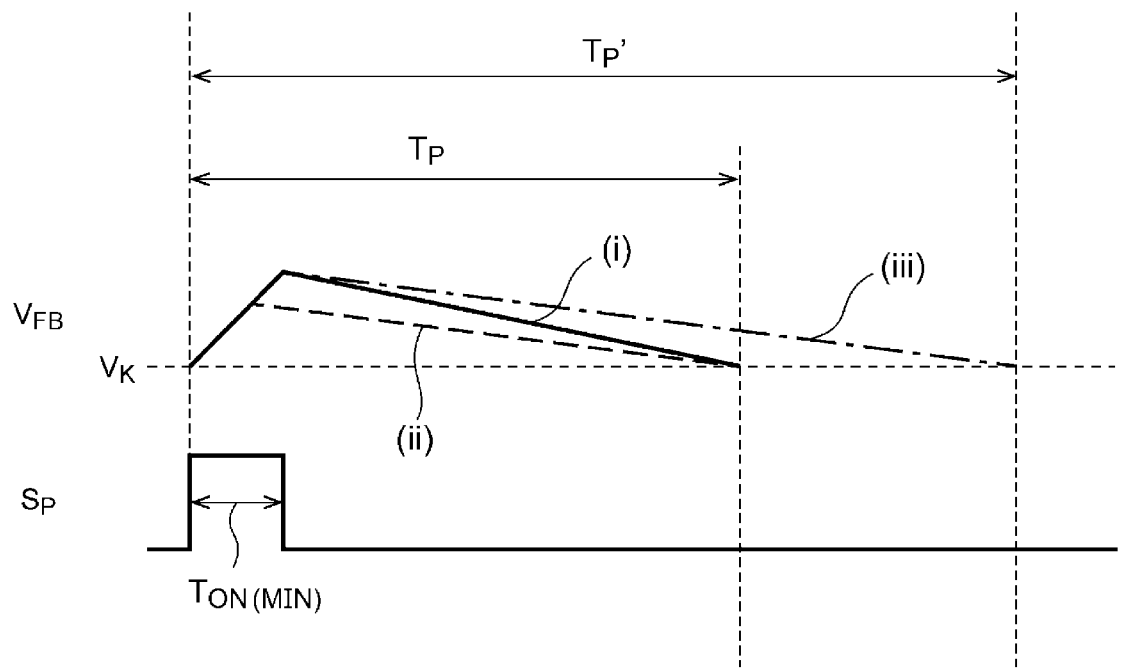
FIG. 3 is a diagram for explaining a limit of the frequency stabilization control.
Figure 4:
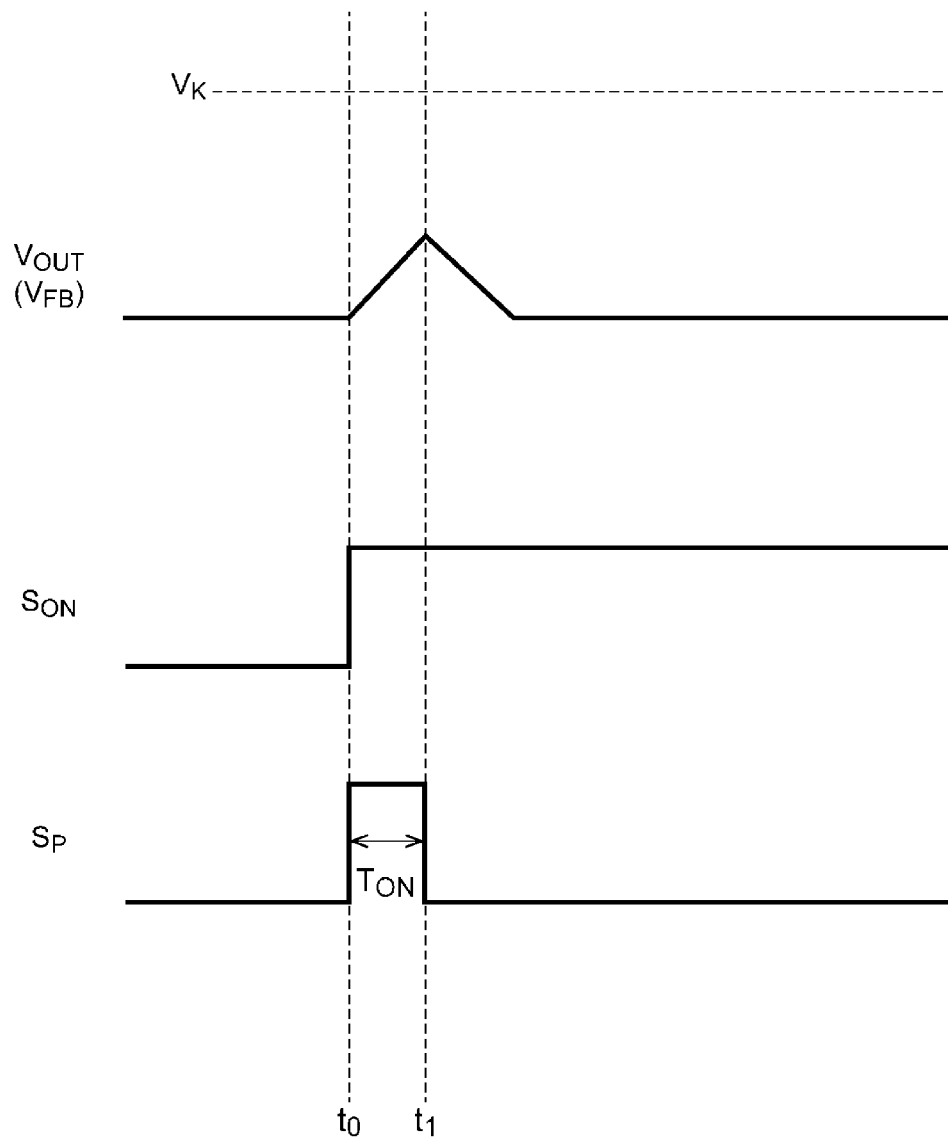
FIG. 4 is a waveform diagram showing the startup operation of the switching power supply shown in FIG. 1.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

In the present specification, the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding.

Embodiment 1

Figure 5:
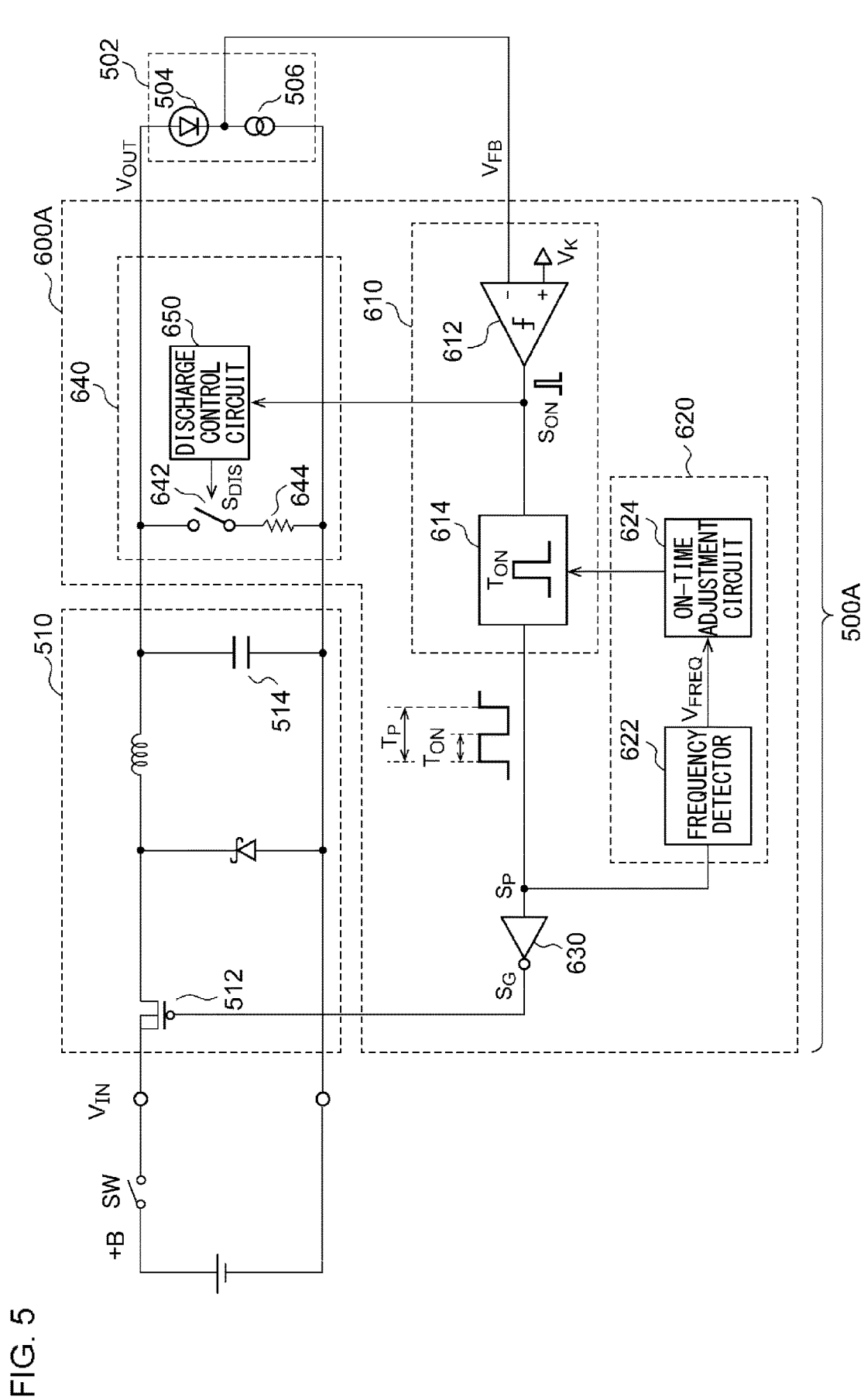
FIG. 5 is a circuit diagram of a switching power supply according to an embodiment 1.

FIG. 5 is a circuit diagram showing a switching power supply 500A according to an embodiment 1. The switching power supply 500A includes a step-down converter 510 and a control circuit 600A. The switching power supply 500A is supplied with a DC voltage $V_{IN}$ from a battery or a different DC power supply via a switch SW.

The step-down converter 510 supplies a driving signal (driving voltage or driving current) to a load 502. The control circuit 600A receives a feedback signal $V_{FB}$ indicative of the electrical state of the load 502 to be controlled.

The load 502 includes a light-emitting element 504 and a current source 506 coupled in series. However, the present invention is not restricted to such an arrangement. The current source 506 maintains the current $I_{DRV}$ that flows through the light-emitting element 504 at an amount of current that corresponds to the target luminance. In this case, the feedback signal $V_{FB}$ may be a voltage across both ends of the current source 506. The following relation expression holds true between the output voltage $V_{OUT}$ and the feedback signal $V_{FB}$. Here, $V_F$ represents the forward voltage (voltage drop) of the light-emitting element 504.

$$V_{OUT} = V_{FB} + V_F$$

The control circuit 600A includes a pulse modulator 610, a frequency stabilization circuit 620, a driver 630, and a dummy load circuit 640. The pulse modulator 610 includes a comparator 612 that compares the bottom limit voltage $V_K$ with the feedback signal $V_{FB}$, which indicates the electrical state of the step-down converter 510 or its load 502. The pulse modulator 610 generates a pulse signal $S_P$ that transits to the on level (e.g., high level) in response to the turn-on signal $S_{ON}$ based on the output of the comparator 612.

The frequency stabilization circuit 620 controls the pulse modulator 610 such that the frequency of the pulse signal $S_P$ approaches the target frequency.

The pulse modulator 610 according to the present embodiment employs a modification of the bottom detection on-time fixed method. Specifically, when the feedback signal $V_{FB}$ decreases to a predetermined bottom threshold value $V_K$, the switching transistor 512 of the step-down converter 510 is turned on. Subsequently, after the elapse of the on time $T_{ON}$, the switching transistor 512 is turned off. The pulse modulator 610 monitors the switching frequency of the switching transistor 512, and feedback controls the on time $T_{ON}$ such that the switching frequency approaches a predetermined target frequency $f_{REF}$.

The pulse modulator 610 includes a pulse generator 614 in addition to the comparator 612. The comparator 612 compares the feedback signal $V_{FB}$ with the bottom threshold value $V_K$. The comparator 612 generates the turn-on signal $S_{ON}$, which is asserted (e.g., high level) when $V_{FB} < V_K$. The pulse generator 614 generates the pulse signal $S_P$, which is set to the on level (e.g., high level) during the on time $T_{ON}$ from the assertion of the turn-on signal $S_{ON}$, and is switched to the off level (e.g., low level) after the on time $T_{ON}$. For example, the pulse generator 614 may be configured as a one-shot multivibrator with a variable pulse width (time constant). Also, the pulse generator 614 may be configured as an analog or digital timer circuit.

The frequency stabilization circuit 620 adjusts the on time $T_{ON}$ by feedback control such that the frequency of the pulse signal $S_P$ approaches the target frequency $f_{REF}$. A frequency detector 622 monitors the pulse signal $S_P$, and generates a frequency detection signal $V_{FREQ}$ indicative of the frequency thus monitored. The frequency detector 622 may generate the frequency detection signal $V_{FREQ}$ based on the gate signal $S_G$ or the turn-on signal $S_{ON}$ instead of the pulse signal $S_P$.

An on-time adjustment circuit 624 adjusts the on time $T_{ON}$ of the pulse generator 614 such that the frequency detection signal $V_{FREQ}$ approaches a predetermined target level $V_{FREQ(REF)}$. It should be noted that, when the frequency of the pulse signal $S_P$ is stabilized to the target value, the period $T_P$ of the pulse signal $S_P$ in this state will be referred to as a "target period $T_{P(REF)}$". Here, the relation $T_{P(REF)} = 1/f_{REF}$ holds true.

The on-time adjustment circuit 624 may include an error amplifier that generates the difference between the frequency detection signal $V_{FREQ}$ and its target level $V_{FREQ(REF)}$. The on time $T_{ON}$ may be adjusted based on the output of the error amplifier.

The configurations of the frequency detector 622 and the on-time adjustment circuit 624 are not restricted in particular. Rather, techniques described in Patent document 1 or that will become available in the future may be employed.

The driver 630 drives the switching transistor 512 based on the pulse signal $S_P$. In a case in which the switching transistor 512 is configured as a P-channel MOSFET, the driver 630 inverts the pulse signal $S_P$ so as to generate the gate signal $S_G$. In a case in which the switching transistor 512 is configured as an N-channel MOSFET, the driver 630 level-shifts the pulse signal $S_P$ so as to generate the gate signal $S_G$.

Next, description will be made regarding the dummy load circuit 640. In the enable state, the dummy load circuit 640 is configured to forcibly decrease the output voltage $V_{OUT}$ of the step-down converter 510. When the off state of the switching transistor 512 continues for a predetermined time τ, the dummy load circuit 640 is set to the enable state. Subsequently, the dummy load circuit 640 is set to the disable state in response to the next turn-on of the switching transistor 512. The predetermined time τ may be set to the target period $T_{REF}$ or longer.

The dummy load circuit 640 includes a discharge switch 642, a resistor 644, and a discharge control circuit 650, for example. The discharge control circuit 650 generates a discharge instruction signal $S_{DIS}$ which is an instruction to turn on and off the discharge switch 642. The discharge switch 642 is configured to turn on when the discharge instruction signal $S_{DIS}$ is set to the high level, and to turn off when the discharge instruction signal $S_{DIS}$ is set to the low level. However, the present invention is not restricted to such an arrangement. During the on period of the discharge switch 642, a capacitor 514 provided to an output unit of the step-down converter 510 is discharged, thereby decreasing the output voltage $V_{OUT}$.

The resistor 644 is adjusted in order to adjust the rate of discharge of the capacitor 514, i.e., the rate of decrease of the output voltage $V_{OUT}$. Also, the resistor 644 may be omitted, and the resistance value of the discharge switch 642 may be optimized. Alternatively, the dummy load circuit 640 may be configured as a current source that can be switched on and off according to the discharge instruction signal $S_{DIS}$. The discharge control circuit 650 generates the discharge instruction signal $S_{DIS}$ based on the turn-on signal $S_{ON}$, the pulse signal $S_P$, or the gate signal $S_G$.

Figure 6:
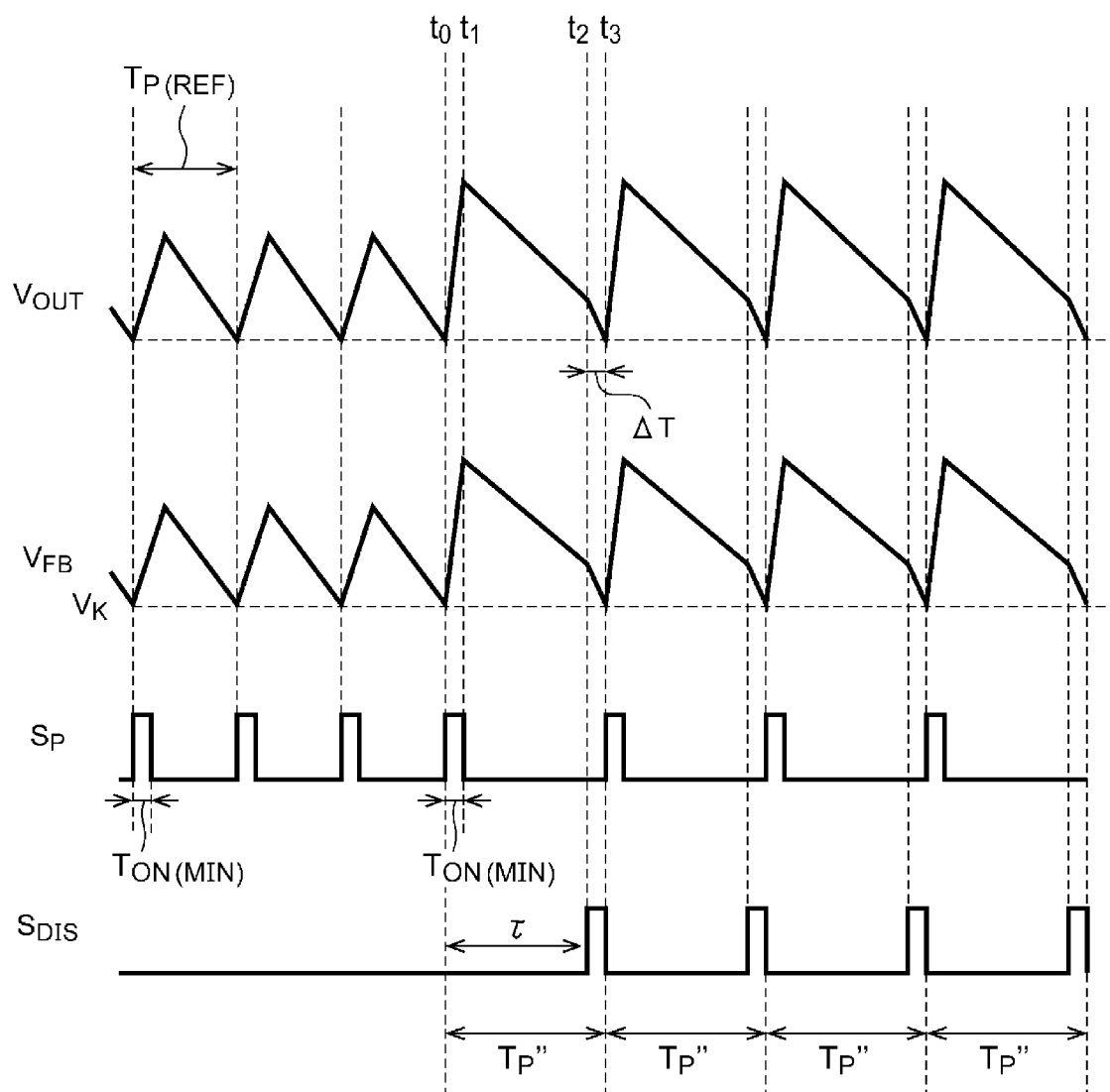
FIG. 6 is an operation waveform diagram showing the operation of the switching power supply shown in FIG. 5.

The above is the configuration of the switching power supply 500A. Next, description will be made regarding the operation thereof. FIG. 6 is an operation waveform diagram showing the operation of the switching power supply 500A shown in FIG. 5. Before the time point t0, the dummy load circuit 640 is set to the disable state. Furthermore, the switching period $T_P$ is maintained so as to be constant by the frequency stabilization circuit 620. Description will be made assuming that the on time $T_{ON}$ is set to the minimum on time $T_{ON(MIN)}$ in this stage.

Description will be made assuming that the input voltage $V_{IN}$ further increases after the time point t0 as compared with before the time point t0. The frequency stabilization circuit 620 attempts to adjust the on time $T_{ON}$ such that it is further shortened in order to maintain the switching frequency $T_P$ at the target value $T_{P(REF)}$. However, the on time $T_{ON}$ is set to the minimum value $T_{ON(MIN)}$ in this stage. That is to say, the on time $T_{ON}$ cannot be further shortened. Accordingly, the output voltage $V_{OUT}$ and the feedback signal $V_{FB}$ increase significantly. Subsequently, at the time point $t_1$, the pulse signal $S_P$ transits to the off level.

In the off period of the switching transistor 512, the output voltage $V_{OUT}$ and the feedback signal $V_{FB}$ decrease. Subsequently, at the time point $t_2$ after a predetermined time τ elapses from the time point to, the discharge instruction signal $S_{DIS}$ is asserted. In response to the assertion of the discharge instruction signal $S_{DIS}$, the dummy load circuit 640 is set to the enable state, which forcibly lowers the output voltage $V_{OUT}$. According to the reduction of the output voltage $V_{OUT}$, the feedback signal $V_{FB}$ is forcibly lowered. Subsequently, when the feedback signal $V_{FB}$ decreases to the bottom limit voltage $V_K$ at the time point $t_3$ immediately after the discharge time ΔT from the time point $t_2$, the turn-on signal $S_{ON}$ is asserted, which sets the pulse signal $S_P$ to the on level. The discharge time ΔT can be set according to the discharge capability of the dummy load circuit 640.

Furthermore, in response to the assertion of the turn-on signal $S_{ON}$, the discharge instruction signal $S_{DIS}$ is negated, which sets the dummy load circuit 640 to the disable state.

The control circuit 600A repeats the operation executed from the time point $t_0$ to the time point $t_3$. The above is the operation of the switching power supply 500A.

With the control circuit 600A, the switching period $T_P''$ after the time point to can be stabilized to $T_P''=τ+ΔT$.

Description has been made with reference to FIG. 6 regarding the operation when the input voltage $V_{IN}$ increases. The same effect can also be obtained in a light load state when the load current $I_{OUT}$ decreases.

As described above, the switching power supply 500A according to the embodiment 1 is capable of preventing the switching period $T_P$ from becoming excessively long due to the increase of the input voltage $V_{IN}$ or the decrease of the output current $I_{OUT}$. This provides improved stability of the frequency.

The advantage of the switching power supply 500A can be clearly understood in comparison with the comparison technique described below. There is a difference in the control of the dummy load circuit 640 between the comparison technique and the present embodiment. Specifically, in the comparison technique, when the off state of the switching transistor 512 continues for a predetermined time, the dummy load circuit 640 is set to the enable state.

With the comparison technique, such an arrangement is capable of suppressing an increase in the switching period $T_P$ accompanying a decrease of the output current $I_{OUT}$. However, when the input voltage $V_{IN}$ increases and the output current $I_{OUT}$ decreases at the same time, i.e., when both the angles of the rising slope and the falling slope of the feedback signal $V_{FB}$ become smaller, the switching period $T_P$ becomes longer than the target value $T_{P(REF)}$. That is to say, such an arrangement is not able to stabilize the frequency.

With the present embodiment, the frequency can be stabilized even in a case in which the input voltage $V_{IN}$ increases and the output current $I_{OUT}$ decreases at the same time.

The present invention encompasses various kinds of apparatuses and methods that can be regarded as a block configuration or a circuit configuration shown in FIG. 5, or otherwise that can be derived from the aforementioned description. That is to say, the present invention is not restricted to a specific configuration. More specific description will be made below regarding example configurations or examples for clarification and ease of understanding of the essence of the present invention and the operation thereof. That is to say, the following description will by no means be intended to restrict the technical scope of the present invention.

Figure 7:
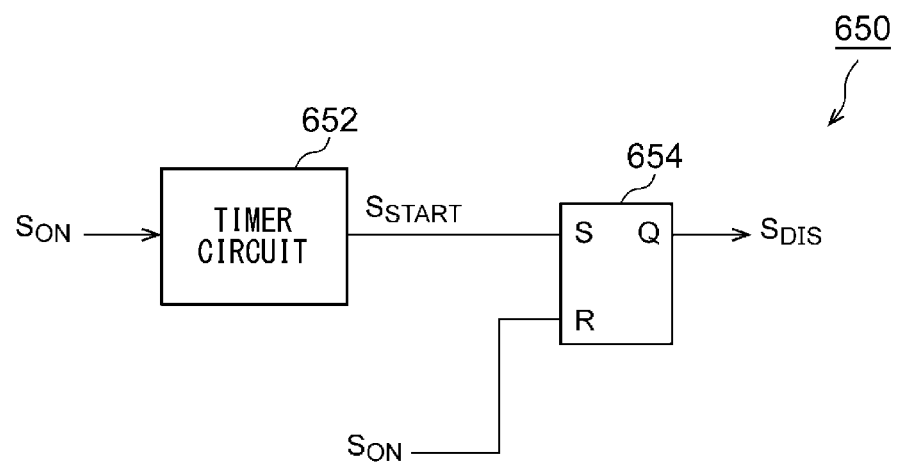
FIG. 7 is a circuit diagram showing an example configuration of a discharge control circuit shown in FIG. 5.

FIG. 7 is a circuit diagram showing an example configuration of the discharge control circuit 650 shown in FIG. 5. The discharge control circuit 650 includes a timer circuit 652 and a flip-flop 654. The timer circuit 652 asserts a discharge start signal $S_{START}$ when the interval of the occurrence of the turn-on of the switching transistor, i.e., the interval of the occurrence of the turn-on signal $S_{ON}$ (or interval of the occurrence of a positive edge of the pulse signal $S_P$) is longer than the predetermined time τ. The timer circuit 652 is configured such that it can be retriggered. When the interval of the assertion of the turn-on signal $S_{ON}$ exceeds the predetermined time τ, the timer circuit 652 outputs the discharge start signal $S_{START}$ in the form of a one-shot signal.

The flip-flop 654 may be configured as an SR flip-flop that is set according to the discharge start signal $S_{START}$, and that is reset according to the next turn-on signal $S_{ON}$ (or pulse signal $S_P$).

Embodiment 2

Figure 8:
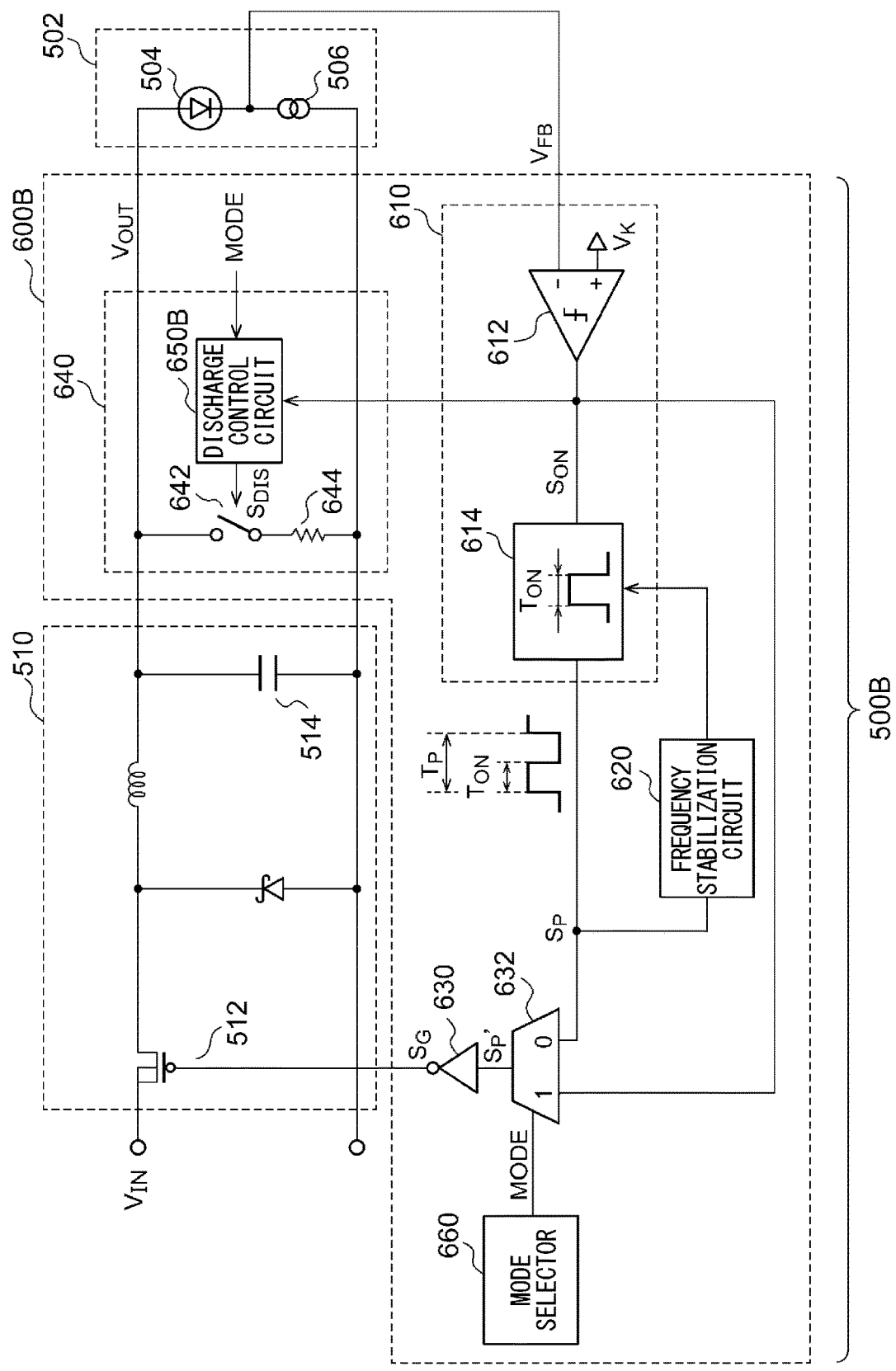
FIG. 8 is a circuit diagram showing a switching power supply including a control circuit according to an embodiment 2.

FIG. 8 is a circuit diagram showing a switching power supply 500B including a control circuit 600B according to an embodiment 2.

The control circuit 600B is configured to be switchable between (i) a first mode in which the switching transistor 512 is driven according to the pulse signal $S_P$, and (ii) a second mode in which the switching transistor 512 is driven according to the turn-on signal $S_{ON}$ in a state in which the pulse generator 614 is bypassed.

In order to provide the mode switching, a selector (multiplexer) 632 is provided as an upstream stage of the driver 630. The multiplexer 632 receives the pulse signal $S_P$ and the turn-on signal $S_{ON}$, and selects one from among the pulse signal $S_P$ and the turn-on signal $S_{ON}$ according to a mode selection signal MODE. Description will be made assuming that, in the first mode, the mode selection signal MODE is set to the low level, and in the second mode, the mode selection signal MODE is set to the high level.

The mode selector 660 generates the mode selection signal MODE according to the operating state of the switching power supply 500B. More specifically, in a steady state in which the switching power supply 500B operates stably, the mode selector 660 selects the first mode. In contrast, immediately after the startup operation of the switching power supply 500B or immediately after a sudden load fluctuation has occurred, i.e., in a transition state of the switching power supply 500B, the mode selector 660 selects the second mode.

In the second mode, during a period in which the turn-on signal $S_{ON}$ is set to the high level, the switching transistor 512 is turned on. Conversely, when the turn-on signal $S_{ON}$ is set to the low level, the switching transistor 512 is turned off.

If the dummy load circuit 640 is enabled at all times regardless of the operating state of the switching power supply 500B, such an arrangement involves an undesirable situation. Specifically, immediately after the switching power supply 500B is started up, rapidly increasing the output voltage $V_{OUT}$ is to be prioritized as compared with the stabilization of the switching frequency. The same can be said of the operation during load fluctuation. That is to say, a rapid response to the load fluctuation is to be prioritized. In the second mode, the dummy load circuit 640 is disabled.

For example, the mode selection signal MODE may be supplied to the discharge control circuit 650B. Also, during a period in which the second mode is selected, the discharge instruction signal $S_{DIS}$ may be fixedly set to the low level.

Figure 9:
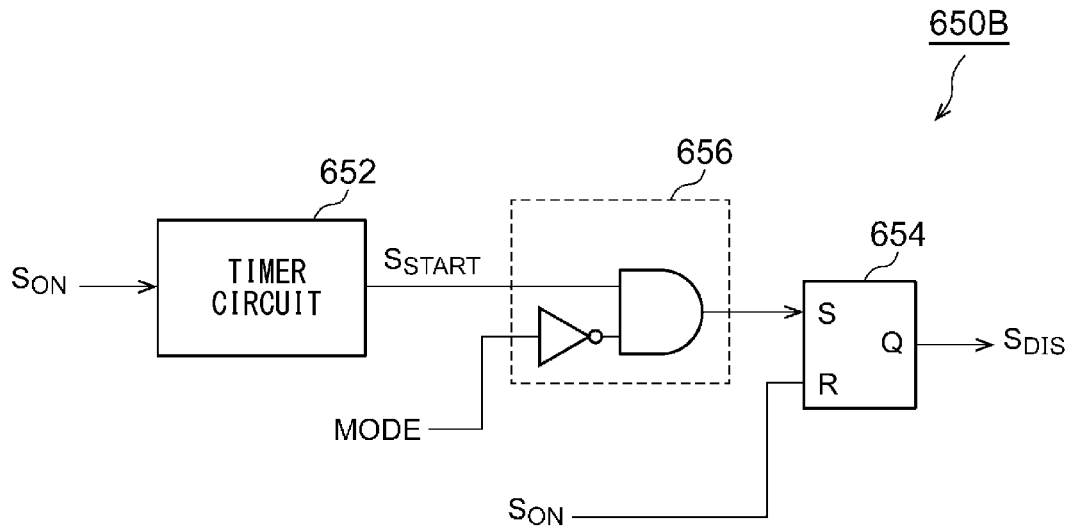
FIG. 9 is a circuit diagram showing an example configuration of a discharge control circuit shown in FIG. 8.

FIG. 9 is a circuit diagram showing an example configuration of the discharge control circuit 650B shown in FIG. 8. The discharge control circuit 650B includes a logic gate 656 in addition to the discharge control circuit 650 shown in FIG. 7. The logic gate 656 masks the discharge start signal $S_{START}$ during a period in which the mode selection signal MODE indicates the second mode. The logic gate 656 may preferably be configured according to the logic levels of the discharge start signal $S_{START}$ and the mode selection signal MODE. In this example, the logic gate 656 is configured as a combination of an inverter and an AND gate.

Figure 10:
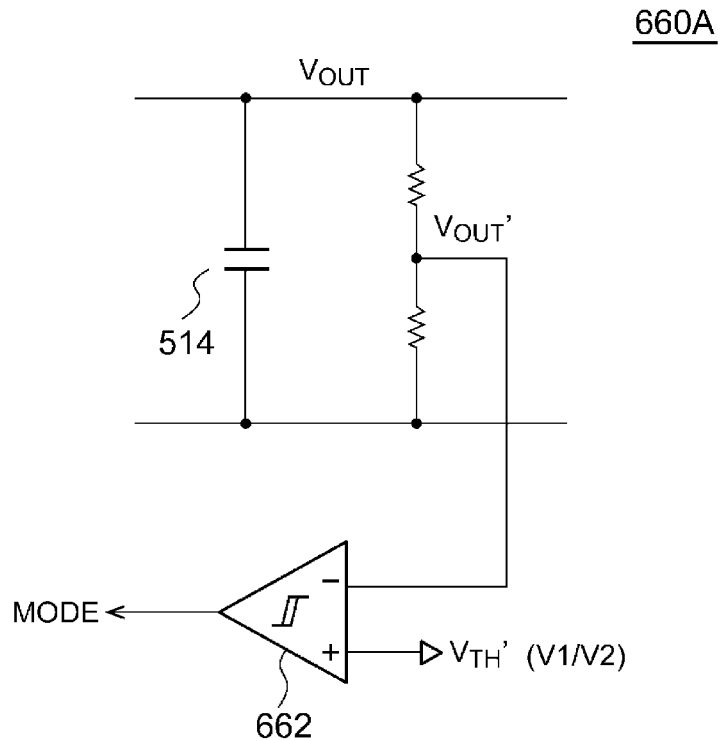
FIG. 10 is a circuit diagram showing a first example configuration of a mode selector.

FIG. 10 is a circuit diagram showing a first example configuration (660A) of the mode selector 660. The mode selector 660A includes a comparator 662 configured to compare the output voltage $V_{OUT}$ with a predetermined threshold voltage $V_{TH}$. When $V_{OUT} > V_{TH}$, the mode selector 660A sets the mode selection signal MODE to the low level so as to select the first mode. Conversely, when $V_{OUT} < V_{TH}$, the mode selector 660A sets the mode selection signal MODE to the high level so as to select the second mode. The comparator 662 may directly compare the output voltage $V_{OUT}$ with a threshold value $V_{TH}$. Also, as shown in FIG. 10, the comparator 662 compares an output voltage $V_{OUT'}$ subjected to voltage division with a scaled threshold value $V_{TH'}$.

With this, in a state in which the output voltage $V_{OUT}$ is low immediately after the startup operation, the second mode can be selected. It should be noted that the comparator 662 is preferably configured as a hysteresis comparator. Description will be made with the upper-side threshold value as a first level V1 and with the lower-side threshold value as a second level V2.

Figure 11:
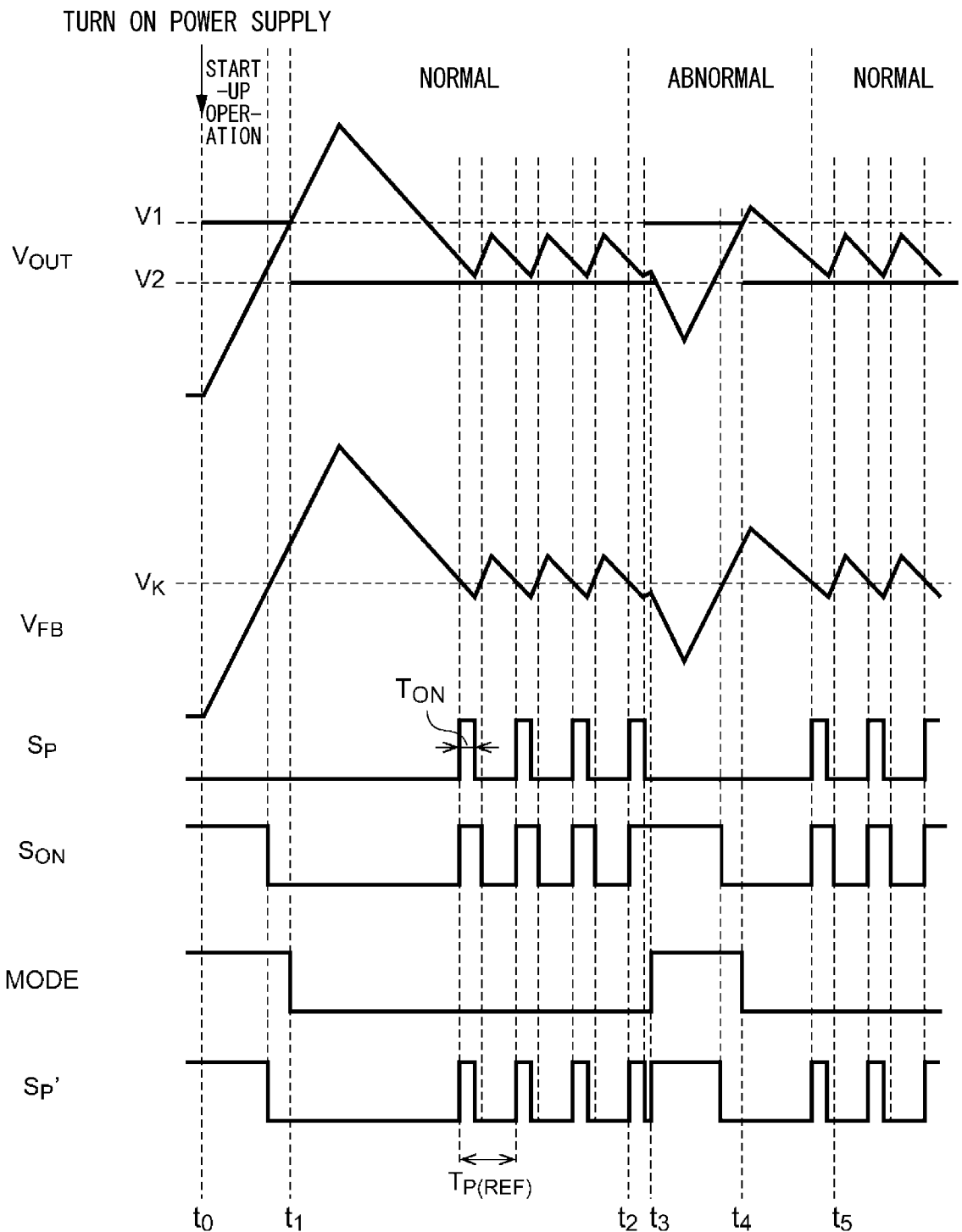
FIG. 11 is an operation waveform diagram showing the operation of the switching power supply including the mode selector shown in FIG. 10.

FIG. 11 is an operation waveform diagram showing the operation of the switching power supply 500B including the mode selector 660A shown in FIG. 10. At the time point to, the startup operation of the switching power supply is started. Immediately after the startup operation, the relation $V_{OUT} < V1$ holds true. Accordingly, the mode selection signal MODE is set to the high level. In this state, the second mode is selected. Accordingly, the switching transistor 512 continues the turn-on state based on the turn-on signal $S_{ON}$, which increases the output voltage $V_{OUT}$.

When the output voltage $V_{OUT}$ exceeds the first level V1 at the time point $t_1$, the mode selection signal MODE is set to the low level, thereby selecting the first mode. Furthermore, the threshold voltage $V_{TH}$ is switched to a second level V2. In the first mode, the switching transistor 512 is switched at a constant frequency based on the pulse signal $S_P$.

It should be noted that there is a delay $T_{DELAY}$ from when the pulse signal $S_P$ is set to the high level to when the output voltage $V_{OUT}$ starts to increase. FIG. 6 shows a waveform in a case in which the delay $T_{DELAY}$ is ignored. FIG. 11 shows a waveform taking into account the delay $\tau_{DELAY}$.

An abnormal state occurs at the time point $t_2$. The output voltage $V_{OUT}$ decreases due to this abnormal state. As a result, at the time point $t_3$, the output voltage $V_{OUT}$ becomes lower than the second-level threshold $V_{TH}$ having the second level V2. In this state, the mode selection signal MODE is set to the high level, thereby selecting the second mode. With this, the switching transistor 512 is turned on according to the turn-on signal having a long pulse width. This allows the voltage level of the output voltage $V_{OUT}$ to be restored quickly.

When the output voltage $V_{OUT}$ exceeds the first-level threshold $V_{TH}$ having the first level V1, at the time point $t_4$, the mode selection signal MODE is set to the low level, thereby returning the mode to the first mode. After the time point $t_5$, the circuit operation is returned to normal circuit operation.

Before the time point $t_1$ or during the period from $t_3$ to $t_4$, which is a period in which the second mode is selected, the switching period becomes longer than the target period $T_{P(REF)}$. In this state, the period of the occurrence of the turn-on signal $S_{ON}$ is longer than the predetermined time τ. Accordingly, a condition is satisfied for the dummy load circuit 640 to be enabled. However, if the dummy load circuit 640 is enabled in this state, the dummy load circuit 640 is set to the enable state in the startup operation as indicated by the line of alternately long and short dashes. This forcibly lowers the output voltage $V_{OUT}$, which impedes the startup operation.

With the control circuit 600B shown in FIG. 8, in the second mode, the dummy load circuit 640 is disabled. This allows the output voltage $V_{OUT}$ to be quickly increased as indicated by the solid line.

Figure 12:
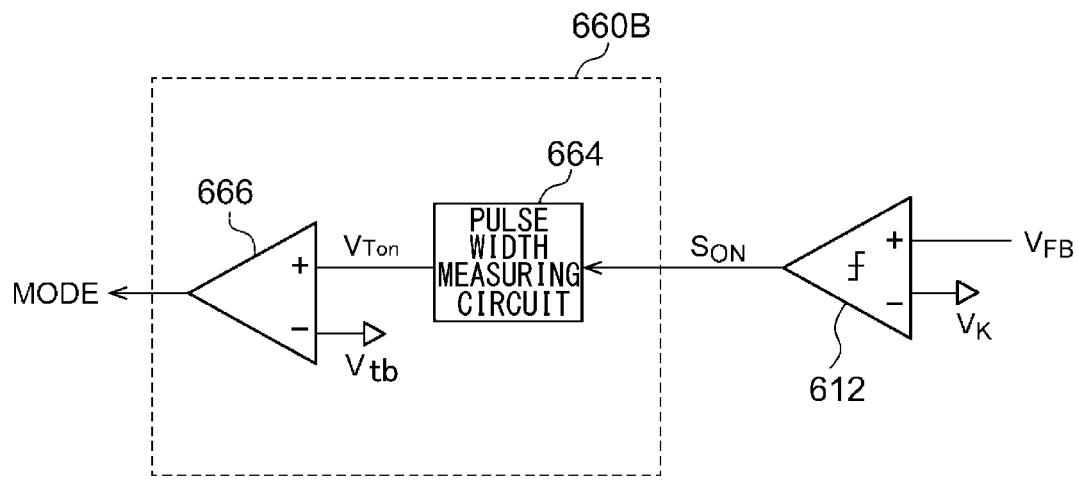
FIG. 12 is a circuit diagram showing a second example configuration of the mode selector.

FIG. 12 is a circuit diagram showing a second example configuration (660B) of the mode selector 660. The mode selector 660B selects the mode based on the pulse width of the turn-on signal $S_{ON}$ generated by the comparator 612. Specifically, when the turn-on signal $S_{ON}$ has a pulse width that is shorter than a predetermined threshold value $\tau_{tb}$, the mode selector 660B selects the first mode. Conversely, when the turn-on signal $S_{ON}$ has a pulse width that is longer than the predetermined threshold value $\tau_{tb}$, the mode selector 660B selects the second mode.

The mode selector 660B includes a pulse width measuring circuit 664 and a comparator 666. The pulse width measuring circuit 664 generates a voltage signal $V_{Ton}$ having a voltage level that corresponds to the pulse width (high-level period length) of the turn-on signal $S_{ON}$. The configuration of the pulse width measuring circuit 664 is not restricted in particular. Also, the pulse width measuring circuit 664 may include a capacitor and a charging circuit that charges the capacitor during a period in which the turn-on signal $S_{ON}$ is set to the high level.

The comparator 666 compares the voltage signal $V_{Ton}$ with a threshold voltage $V_{tb}$ that corresponds to the threshold value $\tau_{tb}$, and outputs the mode selection signal MODE. It should be noted that the pulse width measuring circuit 664 may be replaced by a digital counter, and the comparator 666 may be configured as a digital comparator.

Figure 13:
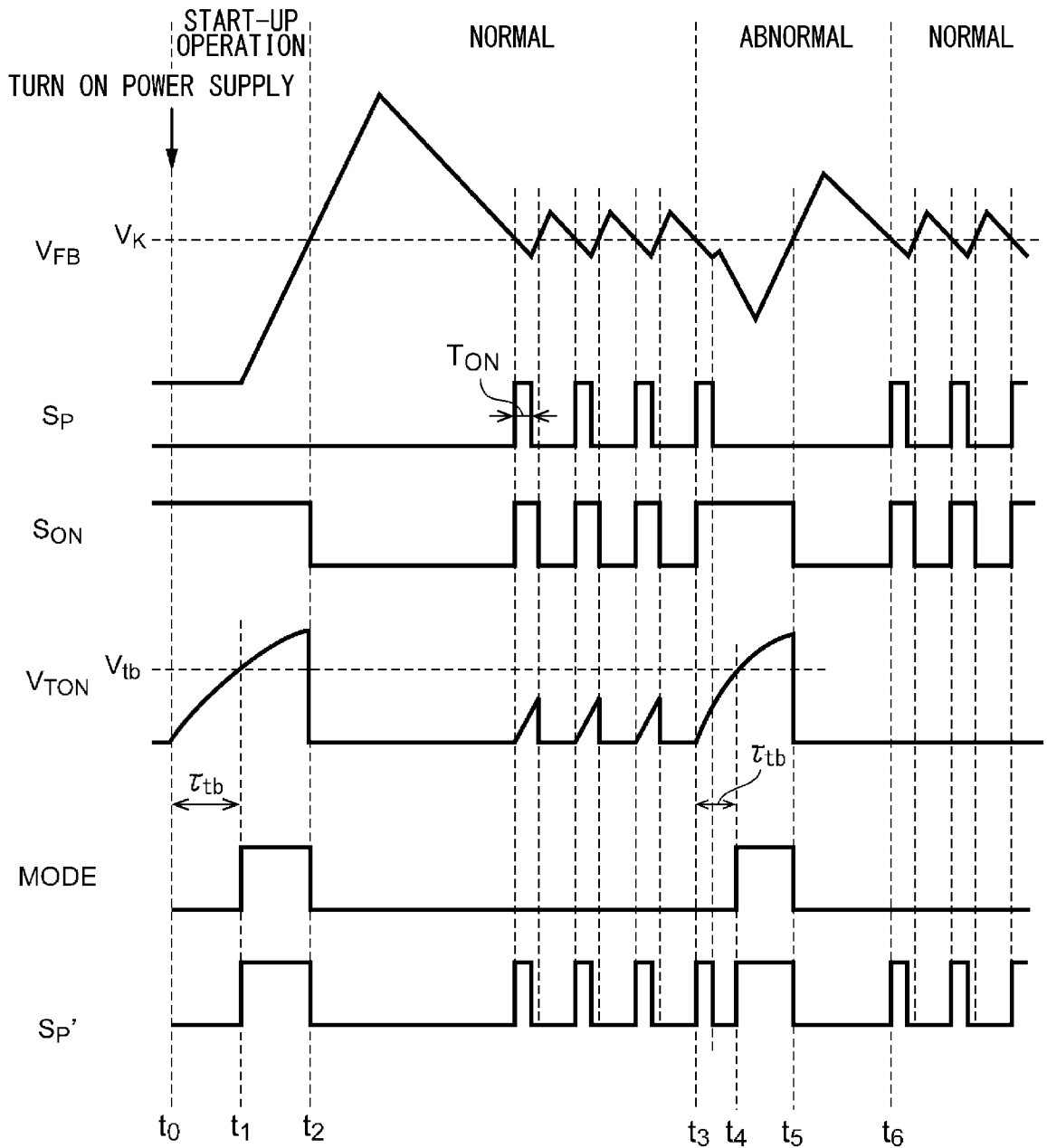
FIG. 13 is an operation waveform diagram showing the operation of the switching power supply including the mode selector shown in FIG. 12.

FIG. 13 is an operation waveform diagram showing the operation of the switching power supply 500B provided with the mode selector 660B shown in FIG. 12. At the time point to, the startup operation of the switching power supply 500B is started. Immediately after the startup operation, the relation $V_{FB} < V_K$ holds true. Accordingly, the turn-on signal $S_{ON}$ is set to the high level. Accordingly, the voltage signal $V_{Ton}$ indicative of the pulse width is increased. When the pulse width exceeds the threshold value $\tau_{tb}$ at the time point $t_1$, i.e., the relation $V_{Ton} > V_{tb}$ holds true, the mode selection signal MODE is set to the high level. In this stage, the mode is set to the second mode, thereby turning on the switching transistor 512. In this state, the switching transistor 512 is continuously turned on, thereby increasing the output voltage $V_{OUT}$ and the feedback signal $V_{FB}$.

When the output voltage $V_{OUT}$ exceeds the bottom limit voltage $V_K$ at the time point $t_2$, the turn-on signal $S_{ON}$ is set to the low level. With this, the relation $V_{Ton}<V_{tb}$ holds true, which sets the mode selection signal MODE to the low level, thereby selecting the first mode. In the first mode, the switching transistor 512 is switched on and off at a constant frequency based on the pulse signal $S_P$.

An abnormal state occurs at the time point $t_3$. When the output voltage $V_{OUT}$ falls due to this abnormal state, the relation $V_{FB}<V_K$ continues. This lengthens the pulse width of the turn-on signal $S_{ON}$. When the pulse width exceeds the threshold value $\tau_{tb}$ at the time point $t_4$, the mode selection signal MODE is set to the high level, which selects the second mode. In this state, the switching transistor 512 is turned on according to the turn-on signal $S_{ON}$ having a long pulse width. This allows the voltage level of the output voltage $V_{OUT}$ to be quickly restored.

When the feedback signal $V_{FB}$ exceeds the bottom limit voltage $V_K$ at the time point $t_5$, the turn-on signal $S_{ON}$ is set to the low level. This returns the mode selection signal MODE to the low level, thereby returning to the first mode. After the time point $t_6$, the circuit operation is returned to normal circuit operation.

Embodiment 3

Figure 14:
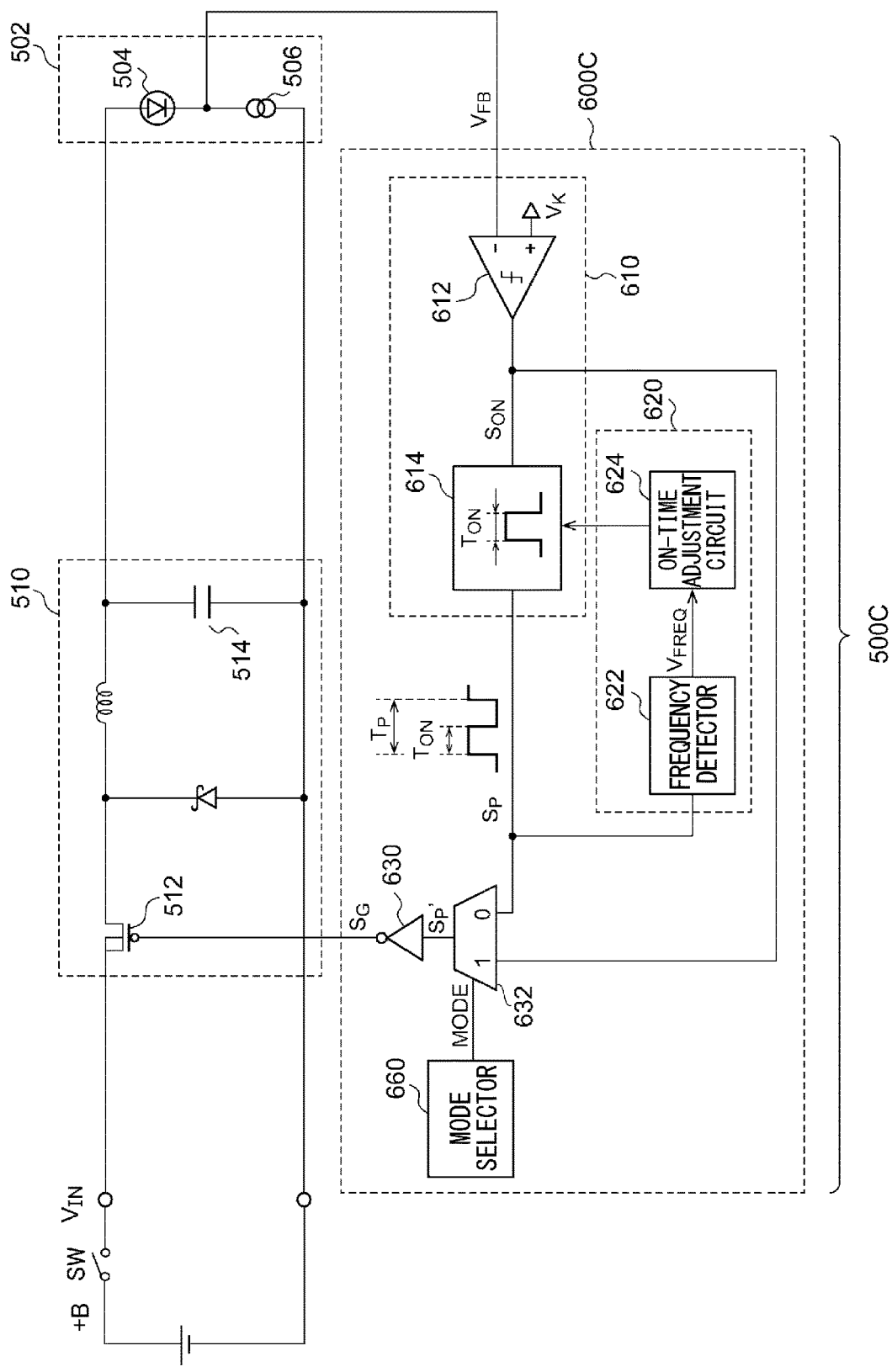
FIG. 14 is a circuit diagram showing a switching power supply according to an embodiment 3.

FIG. 14 is a circuit diagram showing a switching power supply 500C according to an embodiment 3. The switching power supply 500C includes a step-down converter 510 and a control circuit 600C. The switching power supply 500C is supplied with the DC voltage $V_{IN}$ via a switch SW from a battery or a different DC power supply.

The step-down converter 510 supplies a driving signal (driving voltage or driving current) to the load 502. The feedback signal $V_{FB}$ indicative of the electrical state of the load 502 or the step-down converter 510 to be controlled is fed back to control circuit 600C.

The load 502 includes a light-emitting element 504 and a current source 506 coupled in series. However, the present invention is not restricted to such an arrangement. The current source 506 maintains the current $I_{DRV}$ that flows through the light-emitting element 504 at an amount of current that corresponds to the target luminance. In this case, the feedback signal $V_{FB}$ may be a voltage across both ends of the current source 506. The following relation expression holds true between the output voltage $V_{OUT}$ and the feedback signal $V_{FB}$. Here, $V_F$ represents the forward voltage (voltage drop) of the light-emitting element 504.

$$V_{OUT}=V_{FB}+V_F$$

The control circuit 600C includes a pulse modulator 610, a frequency stabilization circuit 620, a driver 630, a multiplexer 632, and a mode selector 660.

The pulse modulator 610 includes a comparator 612 that compares the bottom limit voltage $V_K$ with the feedback signal $V_{FB}$ indicative of the electrical state of the load 502 of the step-down converter 510. The pulse modulator 610 generates a pulse signal $S_P$ that transits to the on level (e.g., high level) in response to the turn-on signal $S_{ON}$ based on the output of the comparator 612.

The frequency stabilization circuit 620 controls the pulse modulator 610 such that the frequency of the pulse signal $S_P$ approaches a target frequency.

The pulse modulator 610 according to the present embodiment employs a modification of the bottom detection on-time fixed method. Specifically, when the feedback signal $V_{FB}$ decreases to a predetermined bottom threshold value $V_K$, the switching transistor 512 of the step-down converter 510 is turned on. Subsequently, after the elapse of the on time $T_{ON}$, the switching transistor 512 is turned off. The pulse modulator 610 monitors the switching frequency of the switching transistor 512, and feedback controls the on time $T_{ON}$ such that the switching frequency approaches a predetermined target frequency $f_{REF}$.

The pulse modulator 610 includes a pulse generator 614 in addition to the comparator 612. The comparator 612 compares the feedback signal $V_{FB}$ with the bottom threshold value $V_K$. The comparator 612 generates the turn-on signal $S_{ON}$, which is asserted (e.g., high level) when $V_{FB}<V_K$. The pulse generator 614 generates the pulse signal $S_P$, which is set to the on level (e.g., high level) during the on time $T_{ON}$ from the assertion of the turn-on signal $S_{ON}$, and is switched to the off level (e.g., low level) after the on time $T_{ON}$. For example, the pulse generator 614 may be configured as a one-shot multivibrator with a variable pulse width (time constant). Also, the pulse generator 614 may be configured as an analog or digital timer circuit.

The frequency stabilization circuit 620 adjusts the on time $T_{ON}$ by feedback control such that the frequency of the pulse signal $S_P$ approaches the target frequency $f_{REF}$. A frequency detector 622 monitors the pulse signal $S_P$, and generates a frequency detection signal $V_{FREQ}$ indicative of the frequency thus monitored. The frequency detector 622 may generate the frequency detection signal $V_{FREQ}$ based on the gate signal $S_G$ or the turn-on signal $S_{ON}$ instead of the pulse signal $S_P$.

An on-time adjustment circuit 624 adjusts the on time $T_{ON}$ of the pulse generator 614 such that the frequency detection signal $V_{FREQ}$ approaches a predetermined target level $V_{FREQ(REF)}$. It should be noted that, when the frequency of the pulse signal $S_P$ is stabilized to the target value, the period $T_P$ of the pulse signal $S_P$ in this state will be referred to as a "target period $T_{P(REF)}$". Here, the relation $T_{P(REF)}=1/f_{REF}$ holds true.

The on-time adjustment circuit 624 may include an error amplifier that generates the difference between the frequency detection signal $V_{FREQ}$ and its target level $V_{FREQ(REF)}$. The on time $T_{ON}$ may be adjusted based on the output of the error amplifier.

The configurations of the frequency detector 622 and the on-time adjustment circuit 624 are not restricted in particular. Rather, techniques described in Patent document 1 or that will become available in the future may be employed.

The control circuit 600C is configured to be switchable between a first mode in which the switching transistor 512 is driven according to the pulse signal $S_P$, and a second mode in which the switching transistor 512 is driven according to the turn-on signal $S_{ON}$ in a state in which the pulse generator 614 is bypassed.

The mode selector 660 generates the mode selection signal MODE according to the operating state of the switching power supply 500C. In the present embodiment, the first mode is assigned to the low level (0) of the mode selection signal MODE, and the second mode is assigned to the high level (1).

The multiplexer 632 receives the pulse signal $S_P$ and the turn-on signal $S_{ON}$. When the mode selection signal MODE indicates the first mode (i.e., low level), the multiplexer 632 selects the pulse signal $S_P$. When the mode selection signal MODE indicates the second mode (i.e., high level), the multiplexer 632 selects the turn-on signal $S_{ON}$.

The driver 630 drives the switching transistor 512 according to the output $S_{P'}$ of the multiplexer 632. In a case in which the switching transistor 512 is configured as a P-channel MOSFET, the driver 630 inverts the pulse signal $S_P$ so as to generate the gate signal $S_G$. In a case in which the switching transistor 512 is configured as an N-channel MOSFET, the driver 630 level-shifts the pulse signal $S_P$ so as to generate the gate signal $S_G$.

Figure 15:
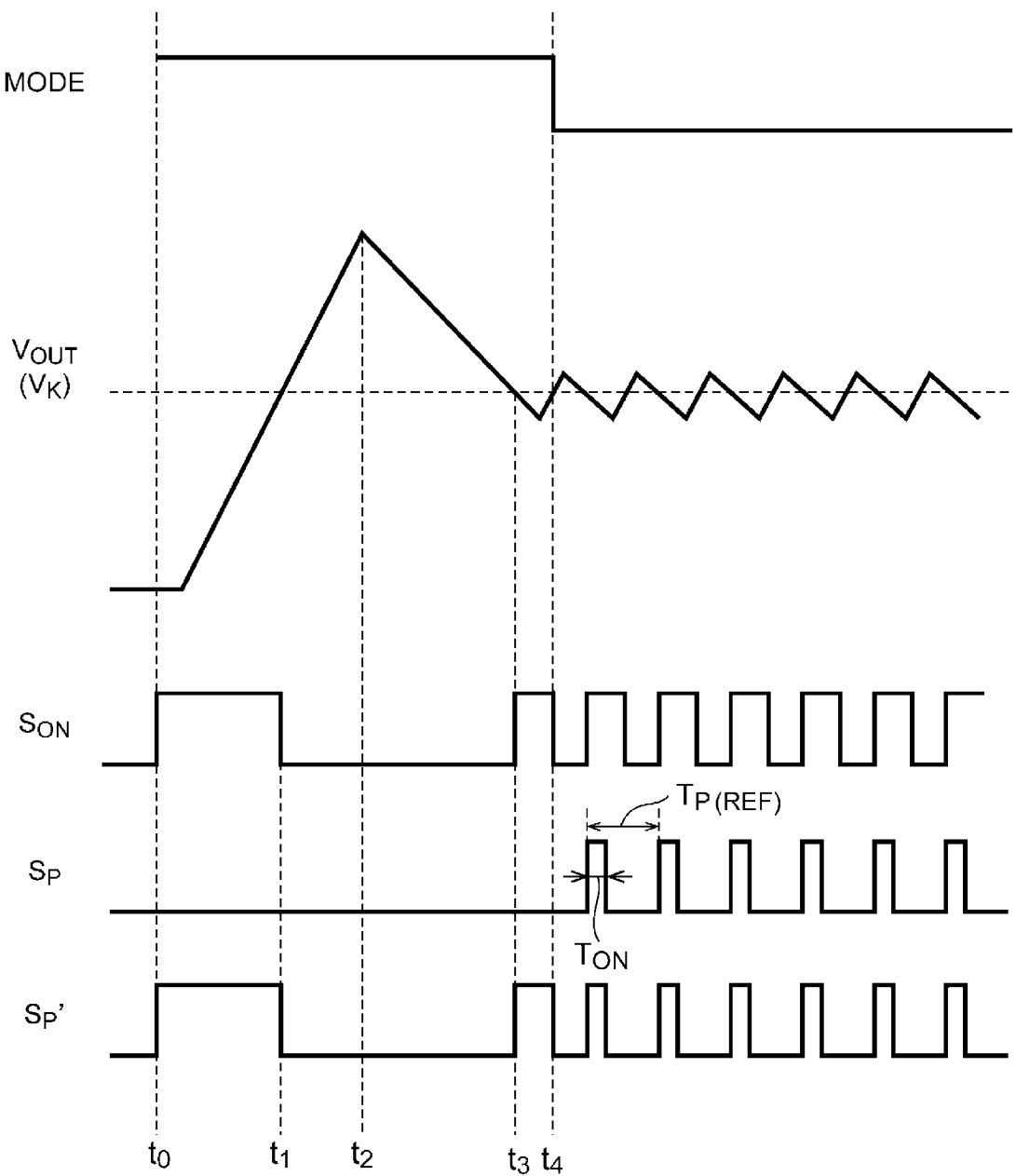
FIG. 15 is a diagram for explaining the startup operation of the switching power supply shown in FIG. 14.

The above is the configuration of the control circuit 600C. Next, description will be made regarding the operation thereof. FIG. 15 is a diagram showing the startup operation of the switching power supply 500C shown in FIG. 14. Here, too, for simplification of description, description will be made regarding an arrangement in which $V_{OUT}=V_{FB}$.

At the time point to, the startup operation of the switching power supply 500C is started. In the startup operation, the second mode is selected. In this mode, the turn-on signal $S_{ON}$ based on the result of the comparison between the feedback signal $V_{FB}$ and the threshold value $V_K$ is employed as the output $S_{P'}$ of the multiplexer. During a period in which $V_{FB}<V_K$, the turn-on signal $S_{ON}$ is set to the high level. Accordingly, in this state, the switching transistor 512 is turned on. This increases the output voltage $V_{OUT}$. When the relation $V_{FB}>V_K$ holds true at the time point $t_1$, the turn-on signal $S_{ON}$ is set to the low level, which sets the output $S_{P'}$ of the multiplexer to the low level. It should be noted that, in actuality, there is a delay from the transition of the pulse signal $S_{P'}$ to the turn-on or turn-off of the switching transistor 512, which is emphasized in FIG. 15.

When the switching transistor 512 is actually turned off at the time point $t_2$, the output voltage $V_{OUT}$ starts to decrease. Subsequently, when the output voltage $V_{OUT}$ becomes lower than the threshold value $V_K$, the turn-on signal $S_{ON}$ and the pulse signal $S_{P'}$ are set to the high level. Subsequently, when the switching transistor 512 is actually turned on, the output voltage $V_{OUT}$ starts to increase.

When the mode is switched to the first mode at the time point $t_4$, the constant frequency control is enabled. Specifically, with the transition (positive edge) of the turn-on signal $S_{ON}$ as a trigger, the pulse signals $S_P$ and $S_{P'}$ are switched to the high level, which turns on the switching transistor 512. Subsequently, after the on time $T_{ON}$ elapses, the pulse signals $S_P$ and $S_{P'}$ are switched to the low level, which turns off the switching transistor 512. With such an arrangement in which the on time $T_{ON}$ is feedback controlled by the frequency stabilization circuit 620, the switching period $T_P$ is stabilized to the target value $T_{P(REF)}$.

The above is the operation of the switching power supply 500C.

With the control circuit 600C, the second mode is selected in a situation in which the switching of the switching transistor 512 stops. This allows the switching power supply 500 to be started up reliably.

Furthermore, when the first mode is selected, the on time of the switching transistor 512 is determined by only the pulse width of the pulse signal $S_P$. That is to say, the on time of the switching transistor 512 is not affected by the pulse width of the turn-on signal $S_{ON}$. Accordingly, such an arrangement is capable of solving a problem that occurs in conventional techniques employing an OR gate. This arrangement is capable of relaxing or eliminating the limit on the target value of the switching frequency.

The present invention encompasses various kinds of apparatuses and methods that can be regarded as a block configuration or a circuit configuration shown in FIG. 14, or otherwise that can be derived from the aforementioned description. That is to say, the present invention is not restricted to a specific configuration. More specific description will be made below regarding example configurations or examples for clarification and ease of understanding of the essence of the present invention and the operation thereof. That is to say, the following description will by no means be intended to restrict the technical scope of the present invention.

Description will be made regarding the mode control supported by the mode selector 660. In the steady state in which the step-down converter 510 operates stably, the mode selector 660 may preferably select the first mode. Immediately after the step-down converter 510 is started up, or immediately after a sudden fluctuation of the load occurs, the mode selector 660 may preferably select the second mode.

Figure 16:
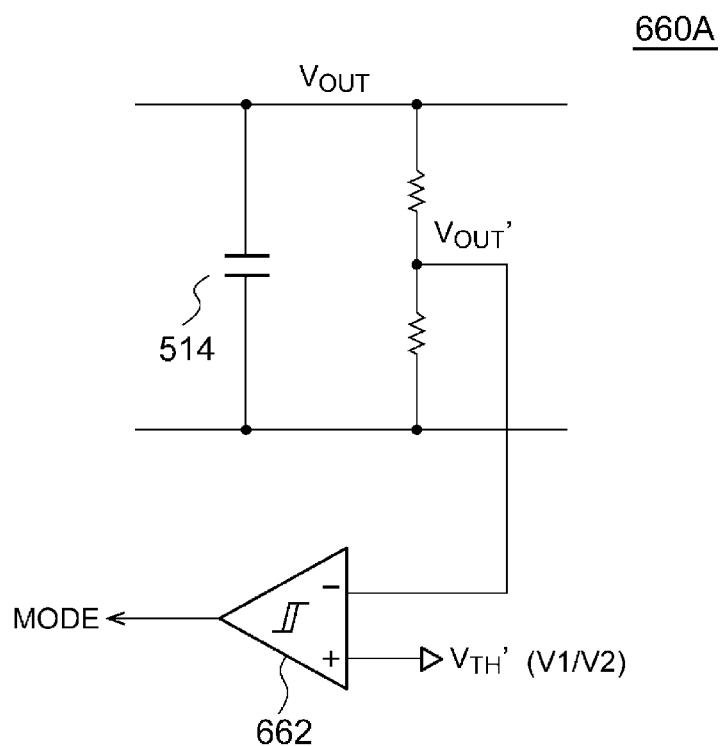
FIG. 16 is a circuit diagram showing a first example configuration of a mode selector.

FIG. 16 is a circuit diagram showing a first example configuration (660A) of the mode selector 660. The mode selector 660A includes a comparator 662 configured to compare the output voltage $V_{OUT}$ with a predetermined threshold voltage $V_{TH}$. When $V_{OUT}>V_{TH}$, the mode selector 660A sets the mode selection signal MODE to the low level so as to select the first mode. Conversely, when $V_{OUT}<V_{TH}$, the mode selector 660A sets the mode selection signal MODE to the high level so as to select the second mode. The comparator 662 may directly compare the output voltage $V_{OUT}$ with a threshold value $V_{TH}$. Also, as shown in FIG. 16, the comparator 662 may compare an output voltage $V_{OUT'}$ subjected to voltage division with a scaled threshold value $V_{TH'}$.

With this, in a state in which the output voltage $V_{OUT}$ is low immediately after the startup operation, the second mode can be selected. It should be noted that the comparator 662 is preferably configured as a hysteresis comparator. Description will be made with the upper-side threshold value as a first level V1 and with the lower-side threshold value as a second level V2.

Figure 17:
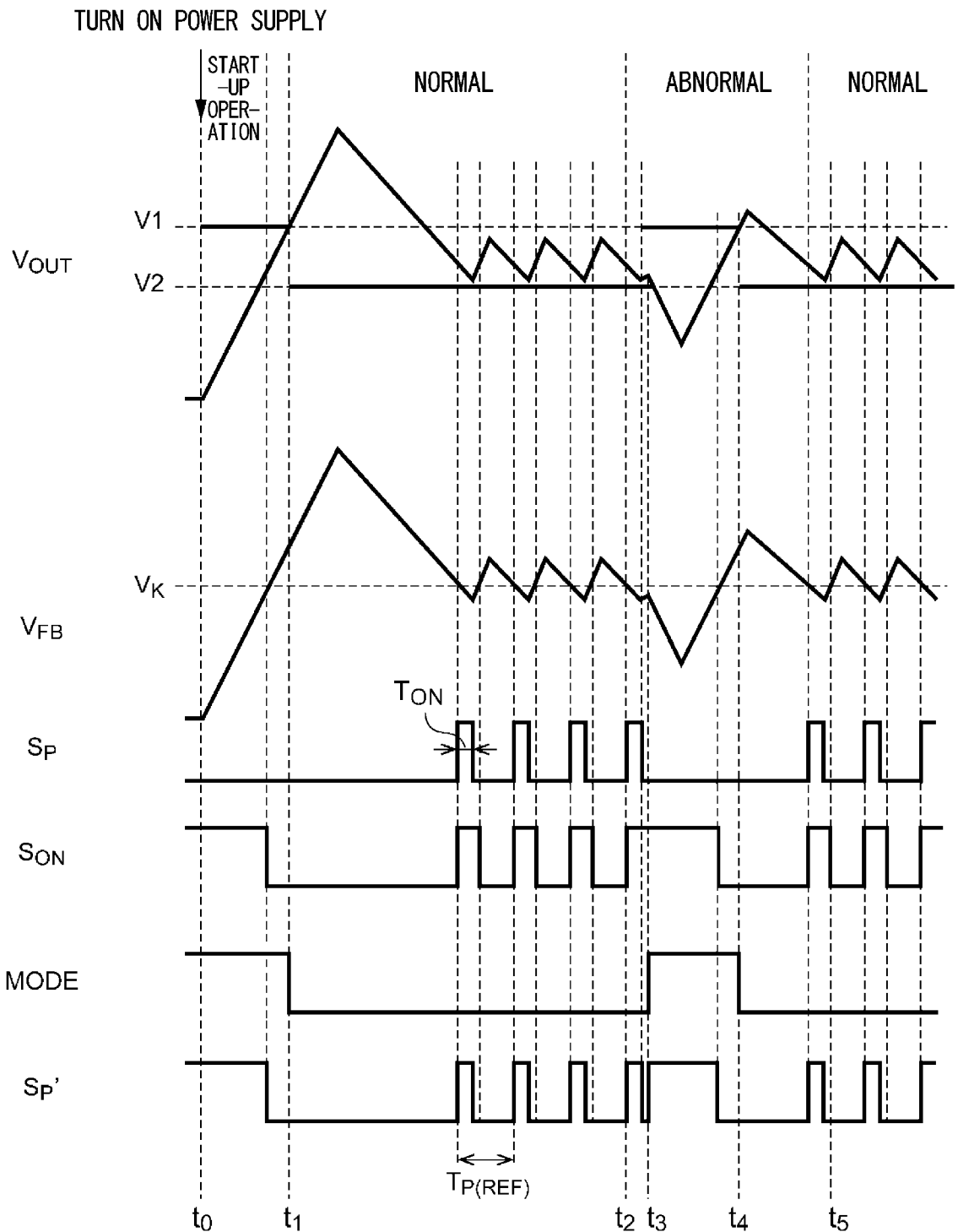
FIG. 17 is an operation waveform diagram showing the operation of the switching power supply including the mode selector shown in FIG. 16.

FIG. 17 is an operation waveform diagram showing the operation of the switching power supply 500C including the mode selector 660A shown in FIG. 16. At the time point to, the startup operation of the switching power supply 500C begins. Immediately after the startup operation, the relation $V_{OUT}<V1$ holds true. Accordingly, the mode selection signal MODE is set to the high level. In this state, the second mode is selected. Accordingly, the switching transistor 512 continues the turn-on state based on the turn-on signal $S_{ON}$, which increases the output voltage $V_{OUT}$.

When the output voltage $V_{OUT}$ exceeds the first level V1 at the time point $t_1$, the mode selection signal MODE is set to the low level, thereby selecting the first mode. Furthermore, the threshold voltage $V_{TH}$ is switched to a second level V2. In the first mode, the switching transistor 512 is switched at a constant frequency based on the pulse signal $S_P$.

An abnormal state occurs at the time point $t_2$. The output voltage $V_{OUT}$ decreases due to this abnormal state. As a result, at the time point $t_3$, the output voltage $V_{OUT}$ becomes lower than the second-level threshold $V_{TH}$ having the second level V2. In this state, the mode selection signal MODE is set to the high level, thereby selecting the second mode. With this, the switching transistor 512 is turned on according to the turn-on signal $S_{ON}$ having a long pulse width. This allows the voltage level of the output voltage $V_{OUT}$ to be restored quickly.

When the output voltage $V_{OUT}$ exceeds the first-level threshold $V_{TH}$ having the first level V1, at the time point $t_4$, the mode selection signal MODE is set to the low level, thereby returning the mode to the first mode. After the time point $t_5$, the circuit operation is returned to normal circuit operation.

Instead of the output voltage $V_{OUT}$, the mode selector 660A may compare the feedback signal $V_{FB}$ with a threshold value, and may determine the mode according to the comparison result thus obtained.

Figure 18:
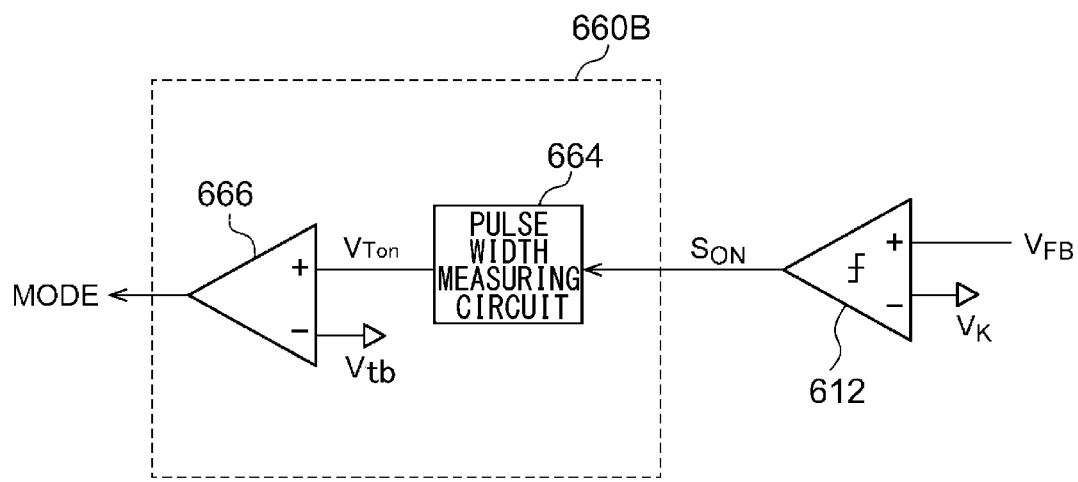
FIG. 18 is a circuit diagram showing a second example configuration of the mode selector.

FIG. 18 is a circuit diagram showing a second example configuration (660B) of the mode selector 660. The mode selector 660B selects the mode based on the pulse width of the turn-on signal $S_{ON}$ generated by the comparator 612. Specifically, when the turn-on signal $S_{ON}$ has a pulse width that is shorter than a predetermined threshold value $\tau_{tb}$, the mode selector 660B selects the first mode. Conversely, when the turn-on signal $S_{ON}$ has a pulse width that is longer than the predetermined threshold value $\tau_{tb}$, the mode selector 660B selects the second mode.

The mode selector 660B includes a pulse width measuring circuit 664 and a comparator 666. The pulse width measuring circuit 664 generates a voltage signal $V_{Ton}$ that corresponds to the pulse width (high-level period length) of the turn-on signal $S_{ON}$. The configuration of the pulse width measuring circuit 664 is not restricted in particular. Also, the pulse width measuring circuit 664 may include a capacitor and a charging circuit that charges the capacitor during a period in which the turn-on signal $S_{ON}$ is set to the high level.

The comparator 666 compares the voltage signal $V_{Ton}$ with a threshold voltage $V_{tb}$ that corresponds to the threshold value $\tau_{tb}$, and outputs the mode selection signal MODE. It should be noted that the pulse width measuring circuit 664 may be replaced by a digital counter, and the comparator 666 may be configured as a digital comparator.

Figure 19:
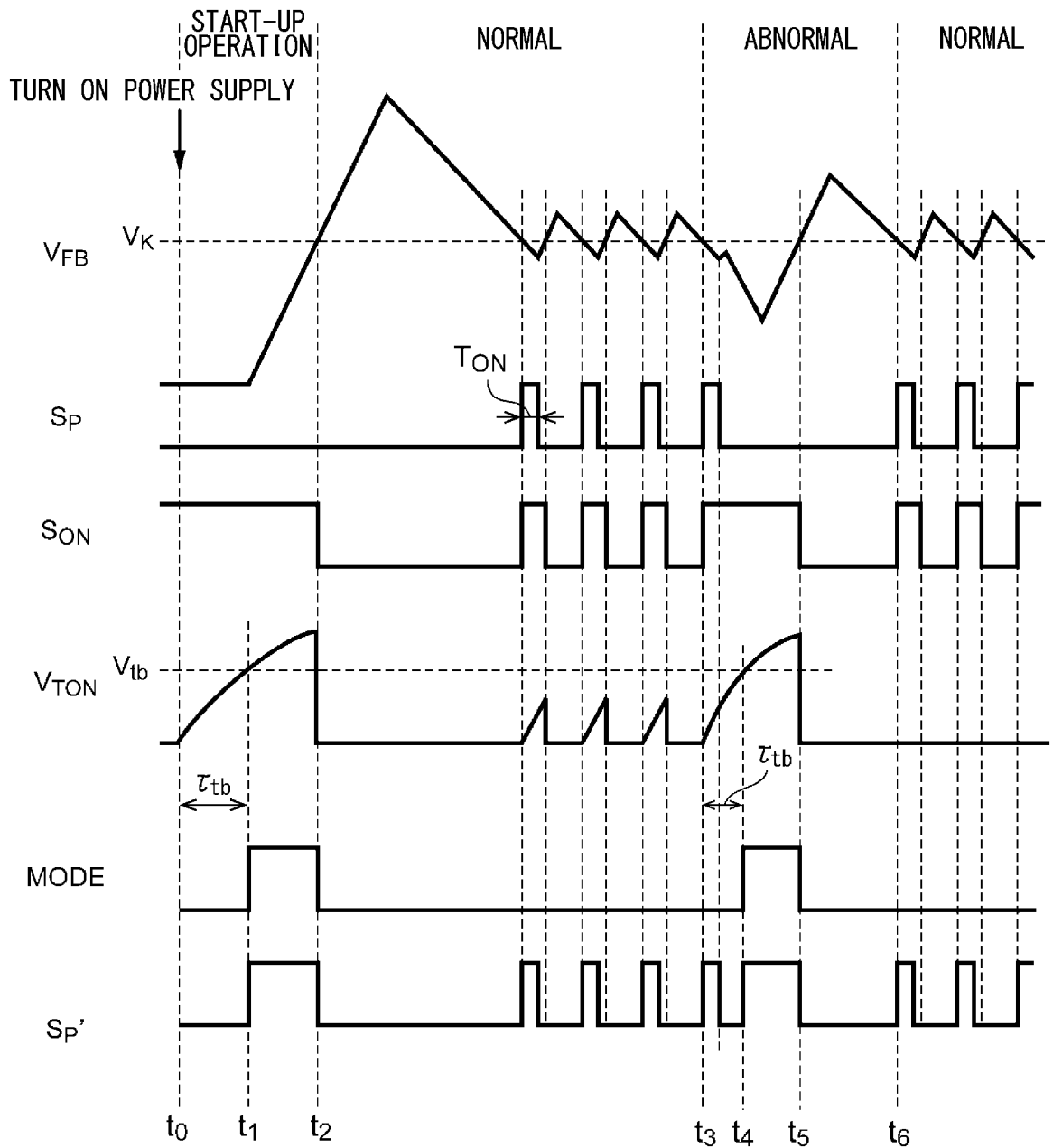
FIG. 19 is an operation waveform diagram showing the operation of the switching power supply including the mode selector shown in FIG. 18.

FIG. 19 is an operation waveform diagram showing the operation of the switching power supply 500C provided with the mode selector 660B shown in FIG. 18. At the time point to, the startup operation of the switching power supply 500C begins. Immediately after the startup operation, the relation $V_{FB}<V_K$ holds true. Accordingly, the turn-on signal $S_{ON}$ is set to the high level. Accordingly, the voltage signal $V_{Ton}$ indicative of the pulse width is increased. When the pulse width exceeds the threshold value $C_{tb}$ at the time point $t_1$, i.e., the relation $V_{Ton}>V_{tb}$ holds true, the mode selection signal MODE is set to the high level. In this stage, the mode is set to the second mode, thereby turning on the switching transistor 512. In this state, the switching transistor 512 is continuously turned on, thereby increasing the output voltage $V_{OUT}$ and the feedback signal $V_{FB}$.

When the output voltage $V_{OUT}$ exceeds the bottom limit voltage $V_K$ at the time point $t_2$, the turn-on signal $S_{ON}$ is set to the low level. With this, the relation $V_{Ton}<V_{tb}$ holds true, which sets the mode selection signal MODE to the low level, thereby selecting the first mode. In the first mode, the switching transistor 512 is switched on and off at a constant frequency based on the pulse signal $S_P$.

An abnormal state occurs at the time point $t_3$. When the output voltage $V_{OUT}$ falls due to this abnormal state, the relation $V_{FB}<V_K$ continues. This lengthens the pulse width of the turn-on signal $S_{ON}$. When the pulse width exceeds the threshold value $\tau_{tb}$ at the time point $t_4$, the mode selection signal MODE is set to the high level, which selects the second mode. In this state, the switching transistor 512 is turned on according to the turn-on signal $S_{ON}$ having a long pulse width. This allows the voltage level of the output voltage $V_{OUT}$ to be quickly restored.

When the feedback signal $V_{FB}$ exceeds the bottom limit voltage $V_K$ at the time point $t_5$, the turn-on signal $S_{ON}$ is set to the low level. This returns the mode selection signal MODE to the low level, thereby returning to the first mode. After the time point $t_6$, the circuit operation is returned to normal circuit operation.

Embodiment 4

Figure 20:
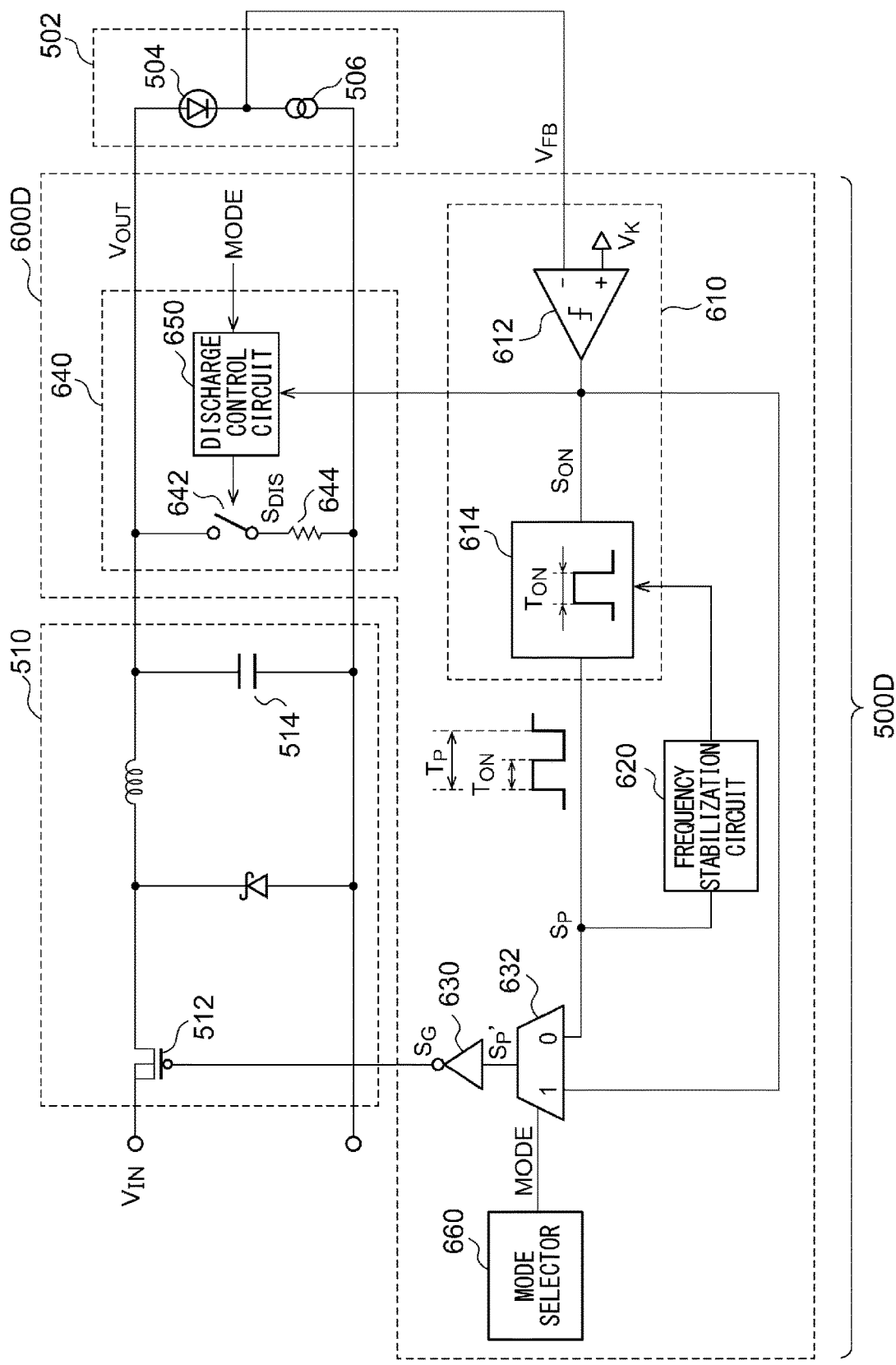
FIG. 20 is a circuit diagram showing a switching power supply according to an embodiment 4.

FIG. 20 is a circuit diagram showing a switching power supply 500D according to an embodiment 4. The switching power supply 500D includes a step-down converter 510 and a control circuit 600D. The control circuit 600D includes a dummy load circuit 640 in addition to the control circuit 600C shown in FIG. 14.

In the enable state, the dummy load circuit 640 is configured to forcibly decrease the output voltage $V_{OUT}$ of the step-down converter 510. When the off state of the switching transistor 512 continues for a predetermined time $\tau$, the dummy load circuit 640 is set to the enable state. Subsequently, the dummy load circuit 640 is set to the disable state in response to the next turn-on of the switching transistor 512. The predetermined time $\tau$ may be set to the target period $T_{REF}$ or longer.

The dummy load circuit 640 includes a discharge switch 642, a resistor 644, and a discharge control circuit 650, for example. The discharge control circuit 650 generates a discharge instruction signal $S_{DIS}$ which is an instruction to turn on and off the discharge switch 642. The discharge switch 642 is configured to turn on when the discharge instruction signal $S_{DIS}$ is set to the high level, and to turn off when the discharge instruction signal $S_{DIS}$ is set to the low level. However, the present invention is not restricted to such an arrangement. During the on period of the discharge switch 642, a capacitor 514 provided to an output unit of the step-down converter 510 is discharged, thereby decreasing the output voltage $V_{OUT}$.

The resistor 644 is adjusted in order to adjust the rate of discharge of the capacitor 514, i.e., the rate of decrease of the output voltage $V_{OUT}$. Also, the resistor 644 may be omitted, and the resistance value of the discharge switch 642 may be optimized. Alternatively, the dummy load circuit 640 may be configured as a current source that can be switched on and off according to the discharge instruction signal $S_{DIS}$. The discharge control circuit 650 generates the discharge instruction signal $S_{DIS}$ based on the turn-on signal $S_{ON}$, the pulse signal $S_P$, or the gate signal $S_G$.

Figure 21:
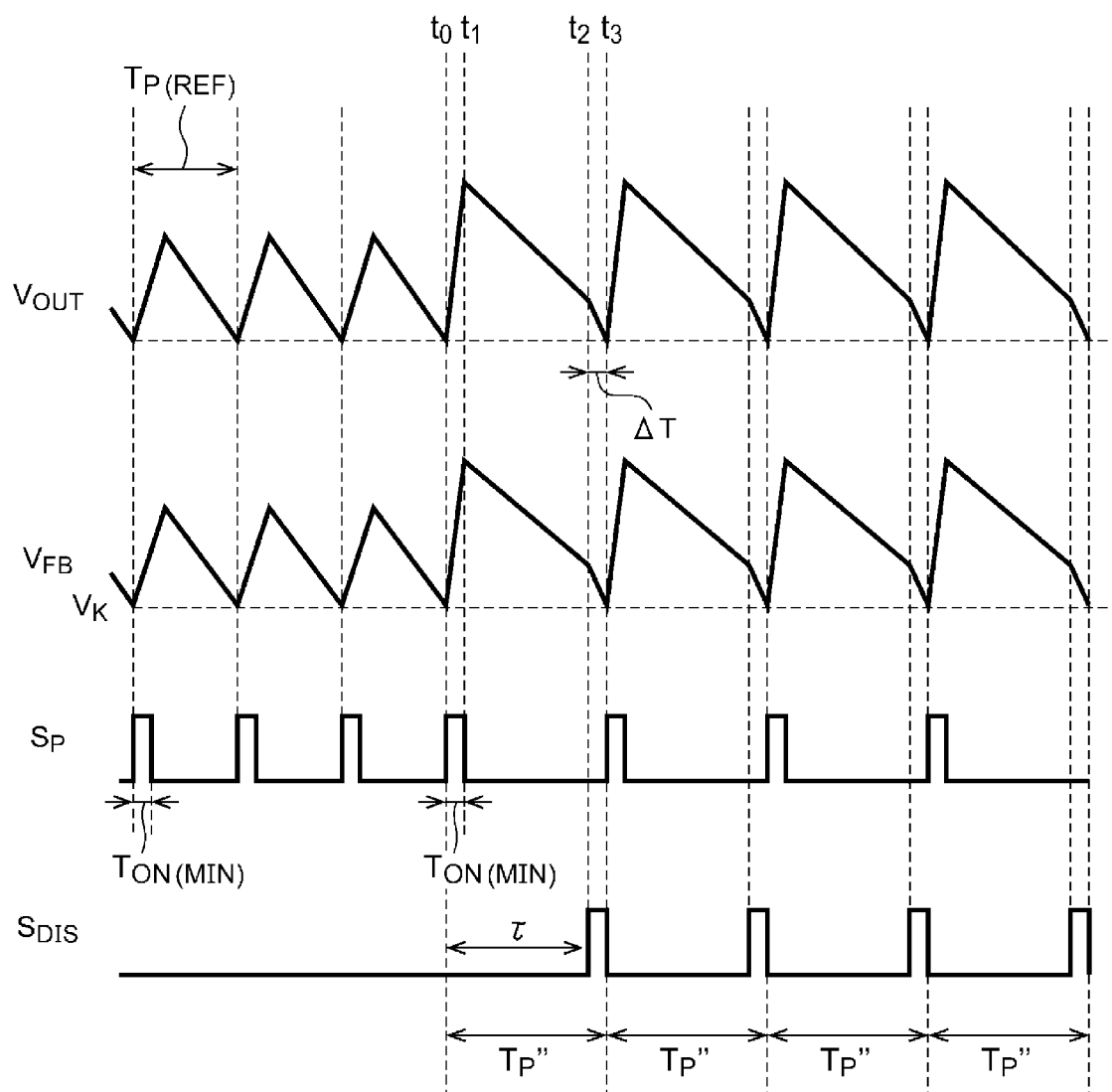
FIG. 21 is an operation waveform diagram showing the operation of the switching power supply shown in FIG. 20.

FIG. 21 is an operation waveform diagram showing the operation of the switching power supply 500D shown in FIG. 20. Before the time point to, the dummy load circuit 640 is set to the disable state. Furthermore, the switching period $T_P$ is maintained so as to be constant by the frequency stabilization circuit 620. Description will be made assuming that the on time $T_{ON}$ is set to the minimum on time $T_{ON(MIN)}$ in this stage.

Description will be made assuming that the input voltage $V_{IN}$ further increases after the time point to as compared with before the time point to. The frequency stabilization circuit 620 attempts to adjust the on time $T_{ON}$ such that it is further shortened in order to maintain the switching frequency $T_P$ at the target value $T_{P(REF)}$. However, the on time $T_{ON}$ is set to the minimum value $T_{ON(MIN)}$ in this stage. That is to say, the on time $T_{ON}$ cannot be further shortened. Accordingly, the output voltage $V_{OUT}$ and the feedback signal $V_{FB}$ increase significantly. Subsequently, at the time point $t_1$, the pulse signal $S_P$ transits to the off level.

In the off period of the switching transistor 512, the output voltage $V_{OUT}$ and the feedback signal $V_{FB}$ decrease. Subsequently, at the time point $t_2$ after a predetermined time $\tau$ elapses from the time point to, the discharge instruction signal $S_{DIS}$ is asserted. In response to the assertion of the discharge instruction signal $S_{DIS}$, the dummy load circuit 640 is set to the enable state, which forcibly lowers the output voltage $V_{OUT}$. According to the reduction of the output voltage $V_{OUT}$, the feedback signal $V_{FB}$ is forcibly lowered. Subsequently, when the feedback signal $V_{FB}$ decreases to the bottom limit voltage $V_K$ at the time point $t_3$ immediately after the discharge time $\Delta T$ from the time point $t_2$, the turn-on signal $S_{ON}$ is asserted, which sets the pulse signal $S_P$ to the on level. The discharge time $\Delta T$ can be set according to the discharge capability of the dummy load circuit 640.

Furthermore, in response to the assertion of the turn-on signal $S_{ON}$, the discharge instruction signal $S_{DIS}$ is negated, which sets the dummy load circuit 640 to the disable state.

The control circuit 600E repeats the operation executed from the time point $t_0$ to the time point $t_3$. The above is the operation of the switching power supply 500D.

With the control circuit 600D, the switching period $T_P''$ after the time point to can be stabilized to $T_P''=\tau+\Delta T$.

Description has been made with reference to FIG. 21 regarding the operation when the input voltage $V_{IN}$ increases. The same effect can also be obtained in a light load state when the load current $I_{OUT}$ decreases.

As described above, the switching power supply 500D according to the embodiment 4 is capable of preventing the switching period $T_P$ from becoming excessively long due to the increase of the input voltage $V_{IN}$ or the decrease of the output current $I_{OUT}$. This provides improved stability of the frequency.

The advantage of the switching power supply 500D can be clearly understood in comparison with the comparison technique described below. There is a difference in the control of the dummy load circuit 640 between the comparison technique and the present embodiment. Specifically, in the comparison technique, when the off state of the switching transistor 512 continues for a predetermined time, the dummy load circuit 640 is set to the enable state.

With the comparison technique, such an arrangement is capable of suppressing an increase in the switching period $T_P$ accompanying a decrease of the output current $I_{OUT}$. However, when the input voltage $V_{IN}$ increases and the output current $I_{OUT}$ decreases at the same time, i.e., when both the angles of the rising slope and the falling slope of the feedback signal $V_{FB}$ become smaller, the switching period $T_P$ becomes longer than the target value $T_{P(REF)}$. That is to say, such an arrangement is not able to stabilize the frequency.

With the present embodiment, the frequency can be stabilized even in a case in which the input voltage $V_{IN}$ increases and the output current $I_{OUT}$ decreases at the same time.

It should be noted that, if the dummy load circuit 640 is enabled at all times regardless of the operating state of the switching power supply 500D, such an arrangement involves an undesirable situation. Specifically, immediately after the switching power supply 500D is started up, rapidly increasing the output voltage $V_{OUT}$ is to be prioritized as compared with the stabilization of the switching frequency. The same can be said of the operation during load fluctuation. That is to say, a rapid response to the load fluctuation is to be prioritized. In the second mode, the dummy load circuit 640 is preferably disabled.

For example, the mode selection signal MODE may be supplied to the discharge control circuit 650. Also, during a period in which the second mode is selected, the discharge instruction signal $S_{DIS}$ may be fixedly set to the low level.

Figure 22:
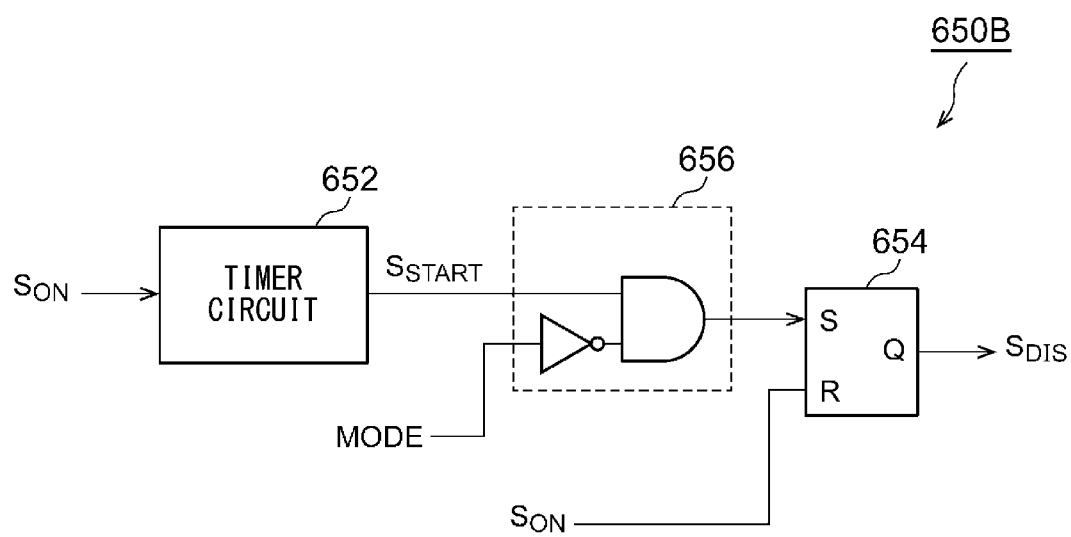
FIG. 22 is a circuit diagram showing an example configuration of a discharge control circuit.

FIG. 22 is a circuit diagram showing an example configuration (650B) of the discharge control circuit 650. The discharge control circuit 650B includes a timer circuit 652, a flip-flop 654, and a logic gate 656. The timer circuit 652 asserts a discharge start signal $S_{START}$ when the interval of the occurrence of the turn-on of the switching transistor, i.e., the interval of the occurrence of the turn-on signal $S_{ON}$ (or interval of the occurrence of a positive edge of the pulse signal $S_P$) is longer than the predetermined time $\tau$. The timer circuit 652 is configured such that it can be retriggered. When the interval of the assertion of the turn-on signal $S_{ON}$ exceeds the predetermined time $\tau$, the timer circuit 652 outputs the discharge start signal $S_{START}$ in the form of a one-shot signal.

During a period in which the mode selection signal MODE indicates the second mode, the logic gate 656 masks the discharge start signal $S_{START}$. The logic gate 656 may preferably be configured according to the logic levels of the discharge start signal $S_{START}$ and the mode selection signal MODE. In this example, the logic gate is configured as a combination of an inverter and an AND gate.

The flip-flop 654 may be configured as an SR flip-flop that is set according to the discharge start signal $S_{START}$ that has passed through the logic gate 656, and that is reset according to the next turn-on signal $S_{ON}$ (or pulse signal $S_P$).

Usage

Figure 23:
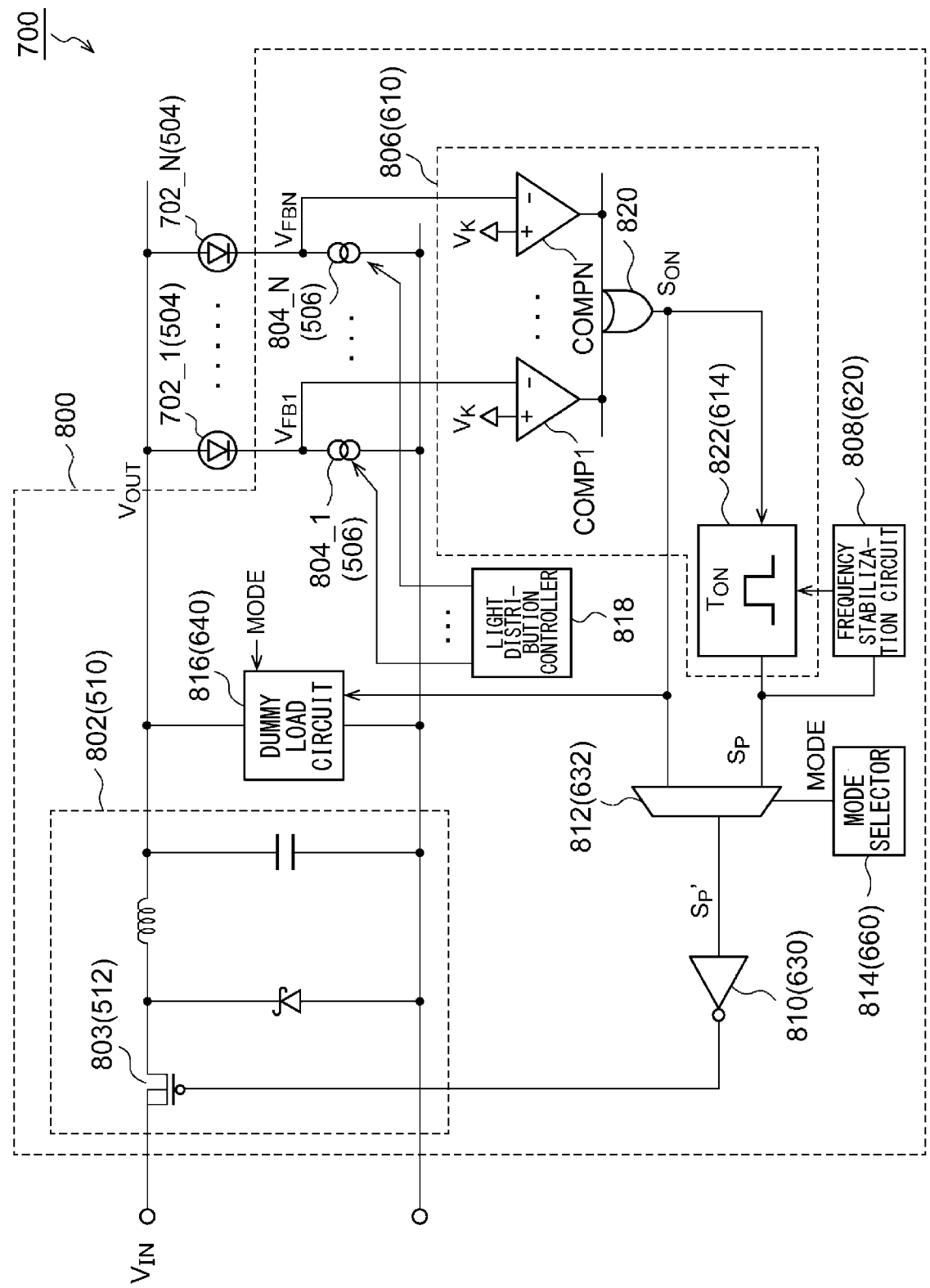
FIG. 23 is a block diagram showing an automotive lamp according to an embodiment.

Next, description will be made regarding the usage of the switching power supply 500 (500A through 500D). The switching power supply 500 may be employed for an automotive lamp. FIG. 23 is a block diagram showing an automotive lamp 700 according to an embodiment. The automotive lamp 700 is configured as a variable light distribution headlamp provided with an Adaptive Driving Beam (ADB) function. The automotive lamp 700 generates a light distribution that corresponds to a control signal received from an unshown Electronic Control Unit (ECU). The automotive lamp 700 is configured based on the architecture of the switching power supply 500B shown in FIG. 8. FIG. 23 shows components with the corresponding reference numerals shown in FIG. 8 in parentheses.

The automotive lamp 700 includes multiple (N>2) light-emitting elements 702_1 through 702_N and a lighting circuit 800 configured to drive the multiple light-emitting elements 702_1 through 702_N.

The multiple light-emitting elements 702_1 through 702_N are each configured as a semiconductor light source such as a light-emitting diode (LED), laser diode (LD), organic electro-luminescence (EL) element, or the like. The multiple light-emitting elements 702_1 through 702_N may be arranged in a matrix so as to form a µLED array.

The lighting circuit 800 includes a step-down converter 802, multiple current sources 804_1 through 804_N, a pulse modulator 806, a frequency stabilization circuit 808, a driver 810, a selector 812, a mode selector 814, a dummy load circuit 816, and a light distribution controller 818.

The multiple current sources 804_1 through 804_N are coupled in series to the multiple light-emitting elements 702_1 through 702_N. Each light emitting element 702_# (#=1, 2, . . . , N) emits light with a luminance that corresponds to a current generated by the corresponding current source 804_#. The multiple current sources 804_1 through 804_N are each configured to be individually on/off controllable (or current controllable). The light distribution controller 818 controls the multiple current sources 804_1 through 804_N based on a light distribution pattern supplied from the ECU, so as to change the light intensity distribution of the μLED array, thereby forming a desired light distribution. The light distribution controller 818 may support PWM dimming control in which the multiple current sources 804_1 through 804_N are switched on and off so as to control the luminance.

When the smallest voltage from among the voltages across the multiple current sources 804_1 through 804_N decreases to the bottom limit voltage $V_K$, the pulse modulator 806 asserts the turn-on signal $S_{ON}$. Subsequently, the pulse modulator 806 generates a pulse signal $S_P$ that transits to the on level in response to the turn-on signal $S_{ON}$ and subsequently transits to the off level. The frequency stabilization circuit 808 controls the pulse modulator 806 such that the frequency of the pulse signal $S_P$ approaches the target frequency.

The pulse modulator 806 includes multiple comparators COMP1 through COMPN, a logic gate 820, and a pulse generator 822. The multiple comparators COMP1 through COMPN correspond to the multiple current sources 804_1 through 804_N, respectively. Each comparator compares the voltage $V_{FB}$ across the corresponding current source 804 with the bottom limit voltage $V_K$. The logic gate 820 combines the output signals of the multiple comparators into a single signal so as to generate the turn-on signal $S_{ON}$. In the present embodiment, the logic gate 820 is configured as an OR gate. Accordingly, as the turn-on signal $S_{ON}$, the output of the comparator COMP that is the earliest to transit to the high level is employed.

The pulse generator 822 generates the pulse signal $S_P$ that transits to the on level (high level) according to the turn-on signal $S_{ON}$, and that transits to the off level (low level) after the on time $T_{ON}$ elapses. The frequency stabilization circuit 808 feedback controls the on time $T_{ON}$ of the pulse generator 822 such that the frequency of the pulse signal $S_P$ approaches the target frequency.

The selector 812 receives the pulse signal $S_P$ and the turn-on signal $S_{ON}$, and selects the one that corresponds to the mode selection signal MODE generated by the mode selector 814. The driver 810 drives the switching transistor 803 according to the signal $S_{P'}$ that is the signal selected by the selector 812.

The dummy load circuit 816 is configured to decrease the driving voltage $V_{OUT}$ in the enable state. When the off state of the switching transistor 803 continues for a predetermined time τ, the dummy load circuit 816 is set to the enable state. Subsequently, the dummy load circuit 816 is set to the disable state in response to the next turn-on of the switching transistor 803. The dummy load circuit 816 may be configured in the same manner as the dummy load circuit 640. Furthermore, the dummy load circuit 816 is supplied with the mode selection signal MODE. During a period in which the second mode is selected, the dummy load circuit 816 is disabled.

Light Source with Integrated Driver

Figure 24:
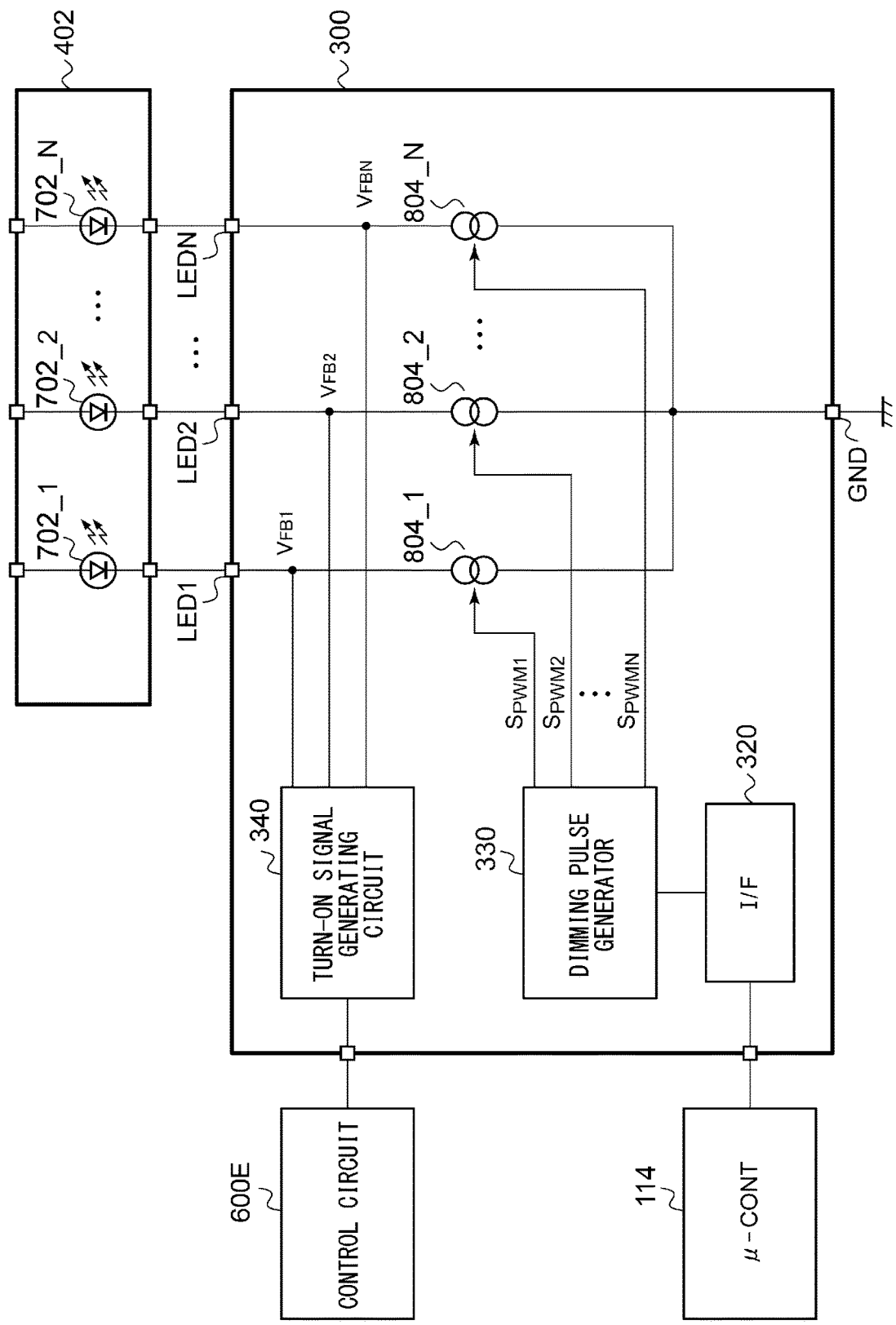
FIG. 24 is a circuit diagram showing a current driver IC and peripheral circuits thereof according to an embodiment.

Next, description will be made regarding a light source with an integrated driver. The multiple current sources 804 shown in FIG. 23 may be integrated on a single semiconductor chip, which will be referred as a "current driver IC (Integrated Circuit) 300" hereafter. FIG. 24 is a circuit diagram showing a current driver IC 300 and a peripheral circuit thereof according to the embodiment. In addition to multiple current sources 804_1 through 804_N, the current driver IC 300 includes an interface circuit 320, a dimming pulse generator 330, and a turn-on signal generating circuit 340. The interface circuit 320 and the dimming pulse generator 330 can be regarded as corresponding to the light distribution controller 818 shown in FIG. 23.

The multiple current sources 804_1 through 804_N are configured to switch independently between the on state and the off state according to PWM signals $S_{PWM1}$ through $S_{PWMN}$, respectively. The current sources 804_1 through 804_N are respectively coupled to the corresponding light-emitting elements 7021 through 702_N in series via cathode pins LED1 through LEDN.

The interface circuit 320 receives multiple items of control data $D_1$ through $D_N$ from an external microcontroller (processor) 114. The kind of the interface is not restricted in particular. For example, a Serial Peripheral Interface (SPI) or I²C interface may be employed. The multiple items of control data $D_1$ through $D_N$ respectively indicate the on/off duty ratios of the multiple current sources 804_1 through 804_N, which are updated at a first time interval $T_1$. The first time interval $T_1$ is set to on the order of 20 ms to 200 ms. For example, the first time interval $T_1$ is set to 100 ms.

The dimming pulse generator 330 generates the multiple PWM signals $S_{PWM1}$ through $S_{PWMN}$ for the multiple current sources 804_1 through 804_N based on the multiple items of control data $D_1$ through $D_N$. In this embodiment, the current driver IC 300 has a built-in function of generating the multiple PWM signals $S_{PWM1}$ through $S_{PWMN}$.

The duty ratio of the i-th PWM signal $S_{PWMi}$ is gradually changed at a second time interval $T_2$ that is shorter than the first time interval $T_1$ from the corresponding control data $D_i$ value before updating to the updated value thereof (which will be referred to as the "gradual-change mode"). The second time interval $T_2$ is set to a value on the order of 1 ms to 10 ms. For example, the second time interval $T_2$ is set to 5 ms.

The dimming pulse generator 330 is capable of supporting a non-gradual-change mode in addition to the gradual-change mode. In the non-gradual-change mode, the duty ratio of the i-th PWM signal $S_{PWMi}$ is allowed to be immediately changed from the corresponding control data $D_i$ value before updating to the updated value thereof.

The dimming pulse generator 330 may preferably be configured to dynamically switch its mode between the non-gradual-change mode and the gradual-change mode according to the settings received from the microcontroller 114. Preferably, the dimming pulse generator 330 may be configured to dynamically switch its mode between the non-gradual-change mode and the gradual-change mode for each channel (for each dimming pulse). The setting data indicative of the mode may be appended to the control data $D_i$.

The turn-on signal generating circuit 340 is configured as a circuit block that generates the turn-on signal $S_{ON}$ based on the voltages across the multiple current sources 804. The turn-on signal generating circuit 340 includes the multiple comparators COMP1 through COMPN and the logic gate 820 shown in FIG. 23. As shown in FIG. 24, in a case in which the entire turn-on signal generating circuit 340 is integrated in the current driver IC 300, such an arrangement allows the wiring arranged between a converter control circuit 600E and the current driver IC 300 to be reduced to a single line configured to transmit the turn-on signal $S_{ON}$.

The control circuit 600E receives the turn-on signal $S_{ON}$, and generates a gate signal $S_G$ of the switching transistor 512. In this example, the pulse generator 822, the selector 812, the driver 810, the mode selector 814, and the frequency stabilization circuit 808 shown in FIG. 23 are integrated in the control circuit 600E. Also, a part of or all of the dummy load circuit 816 may be integrated in the control circuit 600E.

Figure 25:
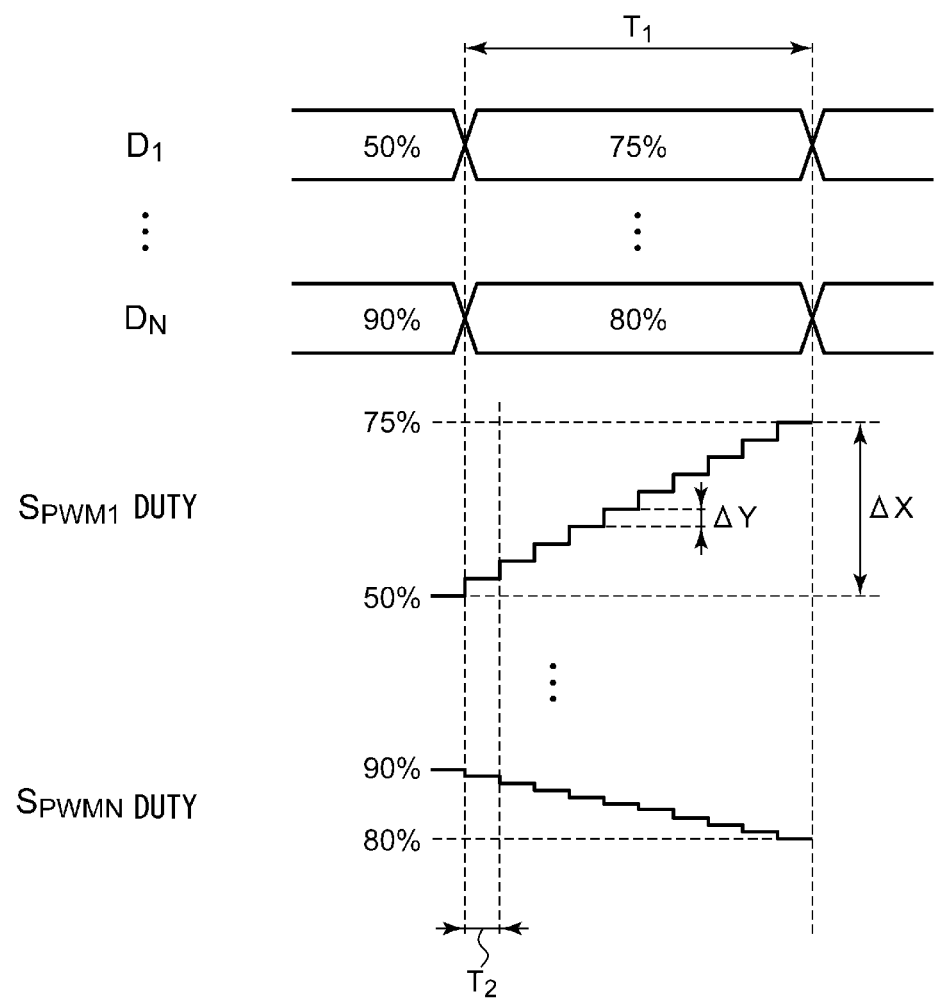
FIG. 25 is an operation waveform diagram showing the operation of a current driver IC.

Next, description will be made regarding the operation of the current driver IC 300. FIG. 25 is an operation waveform diagram showing the operation of the current driver IC 300. Here, description will be made assuming that the duty ratio of the PWM signal is changed linearly. For example, in a case in which $T_1$=100 ms, and $T_2$=5 ms, the duty ratio may preferably be changed in a stepwise manner with 20 steps. With the difference between the control data value before updating and the control data value after updating as X %, the duty ratio of the PWM signal is changed in a stepwise manner with steps of $\Delta Y=(\Delta X/20)\%$ for every time interval $T_2$.

The above is the operation of the current driver IC 300. The advantages of the current driver IC 300 can be clearly understood in comparison with a comparison technique. If the current driver IC 300 does not have the function of gradually changing the duty ratio, the microcontroller 114 must update the control data $D_1$ through $D_N$ that each indicate the duty ratio at the second time interval $T_2$. In a case in which the number of channels N of the light-emitting elements 702 exceeds several dozen to 100, such an arrangement requires a high-performance microcontroller, i.e., a high-cost microcontroller, configured as the microcontroller 114. Furthermore, such an arrangement requires high-speed communication between the microcontroller 114 and the current driver IC 300, thereby leading to the occurrence of a noise problem.

In contrast, with the current driver IC 300 according to the embodiment, this arrangement allows the rate at which the microcontroller 114 updates the control data $D_1$ through $D_N$ to be reduced. This allows the performance required for the microcontroller 114 to be reduced. Furthermore, this allows the communication speed between the microcontroller 114 and the current driver IC 300 to be reduced, thereby solving the noise problem.

The first time interval $T_1$ may preferably be configured to be variable. In a situation in which there is only a small change in the duty ratio, the first time interval $T_1$ is increased so as to reduce the data communication amount, thereby allowing power consumption and noise to be reduced.

As shown in FIG. 24, the multiple light-emitting elements 7021 through 702_N may be integrated on a single semiconductor chip (die) 402. Furthermore, the semiconductor chip 402 and the current driver IC 300 may be housed in a single package in the form of a module.

FIG. 26 shows a plan view and a cross-sectional view of the integrated-driver light source 400. The multiple light-emitting elements 702 are formed in a matrix on the top surface of the semiconductor chip 402. The bottom surface of the semiconductor chip 402 is provided with pairs of back-face electrodes A and K that each correspond to a pair of an anode electrode and a cathode electrode of each of the multiple light-emitting elements 702. In this drawing, only a single connection relation is shown for the light-emitting element 702_1.

The semiconductor chip 402 and the current driver IC 300 are mechanically joined and electrically coupled. The top surface of the current driver IC 300 is provided with top surface electrodes 410 (LED1 through LEDN in FIG. 24) to be respectively coupled to the cathode electrodes K of the multiple light-emitting elements 702 and top surface electrodes 412 to be respectively coupled to the anode electrodes A of the multiple light-emitting elements 702. Each top surface electrode 412 is coupled to a corresponding bump (or pad) 414 provided to a package substrate configured as a bottom surface of the current driver IC 300. Also, an unshown interposer may be arranged between the semiconductor chip 402 and the current driver IC 300.

The kind of the package of the integrated-driver light source 400 is not restricted in particular. As the package of the integrated-driver light source 400, a Ball Grid Array (BAG), Pin Grid Array (PGA), Land Grid Array (LGA), Quad Flat Package (QFP), or the like, may be employed.

Modifications

Lastly, description will be made regarding modifications thereof.

Modification 1

Figure 27:
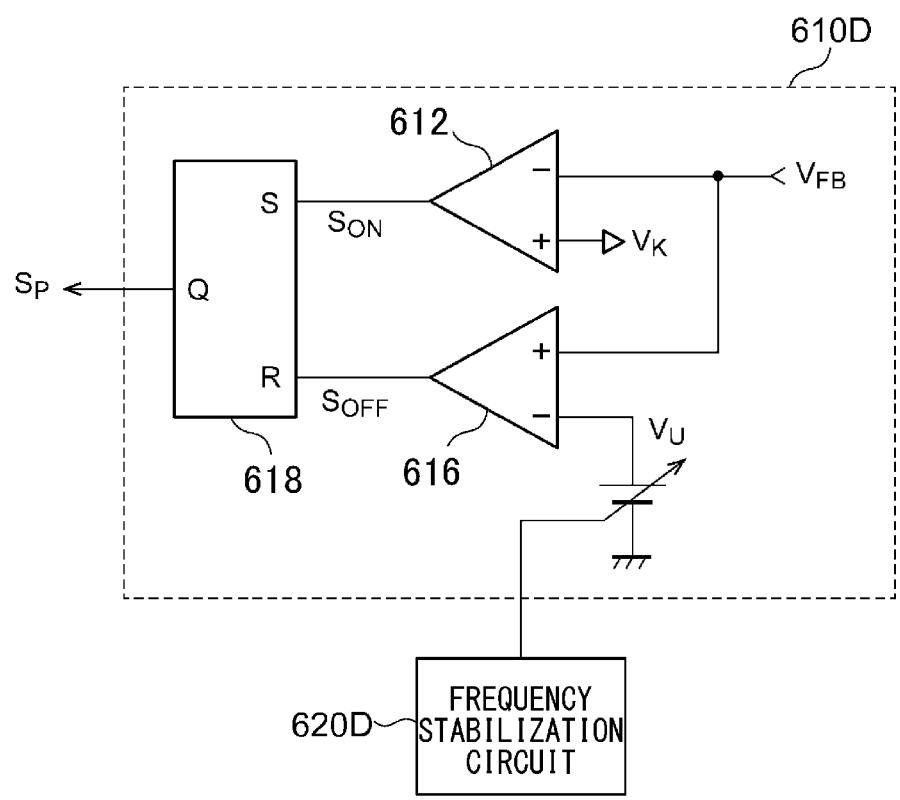
FIG. 27 is a circuit diagram showing a modification of a pulse modulator.

FIG. 27 is a circuit diagram showing a modification (610D) of the pulse modulator 610. The pulse modulator 610D includes an upper-voltage detection comparator 616 for detecting an upper voltage and a flip-flop 618 instead of the pulse generator 614. The upper-voltage detection comparator 616 compares the feedback signal $V_{FB}$ with an upper limit voltage $V_U$. When the feedback signal $V_{FB}$ reaches the upper limit voltage $V_U$, the upper-voltage detection comparator 616 asserts (sets to the high level, for example) the turn-off signal $S_{OFF}$. The flip-flop 618 receives the turn-on signal $S_{ON}$ and the turn-off signal $S_{OFF}$. The flip-flop 618 generates the pulse signal $S_P$ that transits to the on level in response to the turn-on signal $S_{ON}$, and that transits to the off level in response to the turn-off signal $S_{OFF}$. In this modification, the frequency stabilization circuit 620D feedback controls the upper limit voltage $V_U$ such that the frequency of the pulse signal $S_P$ approaches the target frequency. The on time $T_{ON}$ is a period of time from the turn-on of the switching transistor to a time point at which the feedback signal $V_{FB}$ reaches the upper limit voltage $V_U$. Accordingly, with such an arrangement in which the upper limit voltage $V_U$ is feedback controlled, such an arrangement is capable of adjusting the on time $T_{ON}$. This allows the switching frequency to be maintained so as to be constant.

Modification 2

Description has been made with reference to FIG. 23 regarding an arrangement in which the turn-on signal $S_{ON}$ is generated by the multiple comparators COMP1 through COMPN and the logic gate 820. However, the present invention is not restricted to such an arrangement. For example, an arrangement may be made provided with a voltage selection circuit that selects the smallest voltage from among the multiple feedback voltages $V_{FB}$, and a comparator that compares the output of the voltage selection circuit with the bottom limit voltage $V_K$.

Modification 3

Figure 28:
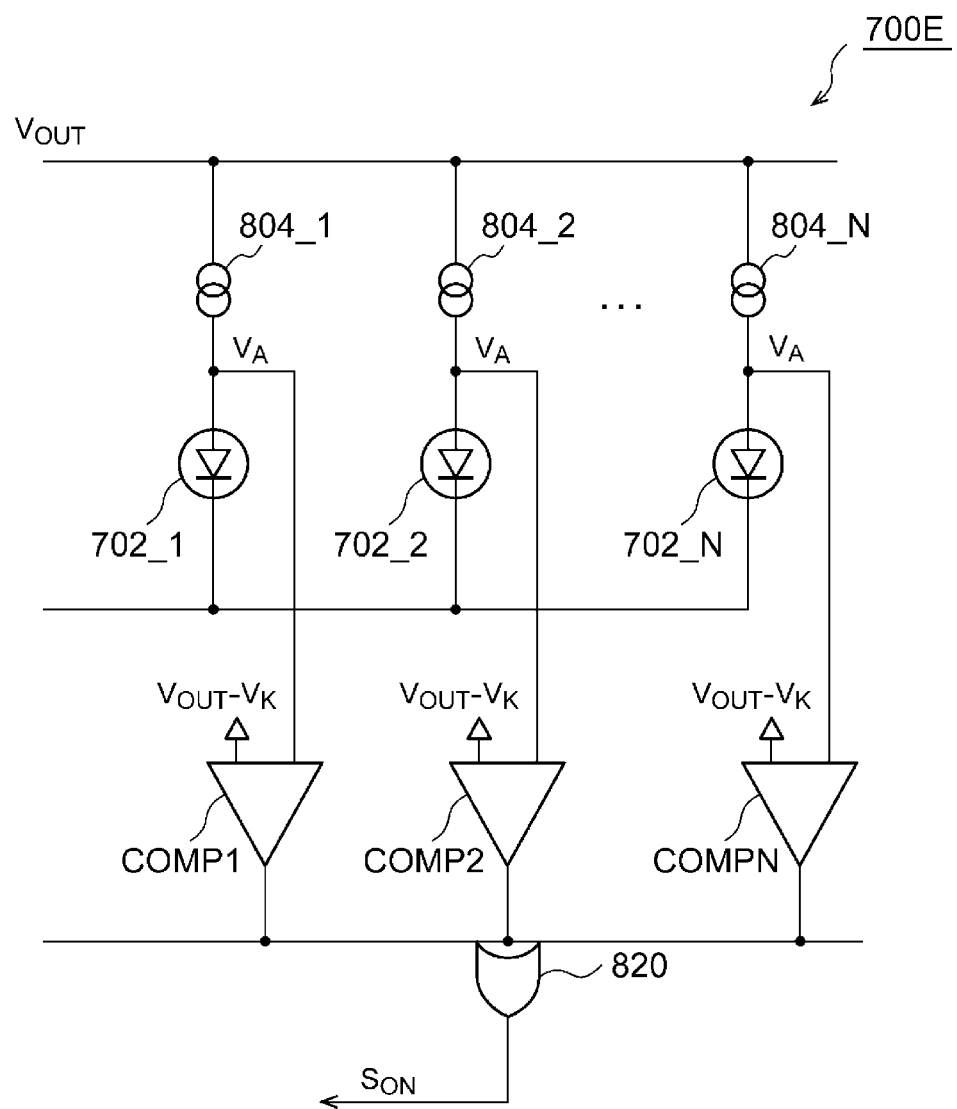
FIG. 28 is a block diagram showing a part of an automotive lamp according to a modification 3.

Description has been made in the embodiment regarding an arrangement in which each current source 506 (804) is configured as a sink circuit, and is coupled to the cathode of the light-emitting element 504 (702). However, the present invention is not restricted to such an arrangement. FIG. 28 is a block diagram showing a part of an automotive lamp 700E according to a modification 3. In this modification, the current sources 804_1 through 804_N are each configured as a current source circuit, and are coupled to the anodes of the light-emitting elements 702_1 through 702_N.

Each comparator COMP # is configured to compare the voltage $V_{FB}$ across the corresponding current source 804_# with the bottom limit voltage $V_K$. For example, each comparator COMP # may compare the anode voltage $V_A$ of the corresponding light-emitting element 702_# with ($V_{OUT}$−$V_K$). Alternatively, the voltage drop, i.e., ($V_{OUT}$−$V_A$), across the current source 804 may be converted into a voltage with the ground voltage as a reference. The comparator COMP # may compare the voltage thus converted with the bottom limit voltage $V_K$.

Modification 4

Also, the mode selector 660 may be omitted. Also, the mode selection signal may be generated by a higher-level controller provided as an external component of the control circuit 600.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

Clauses Describing Features of the Disclosure

Clause 1. A lighting circuit structured to drive a plurality of light-emitting elements, the lighting circuit comprising:

a plurality of current sources to be respectively coupled in series to corresponding light-emitting elements;

a step-down switching converter structured to supply a driving voltage across each of a plurality of series connection circuits formed of the plurality of light-emitting elements and the plurality of current sources;

a pulse modulator structured to generate a pulse signal that transits to an on level when a smallest voltage from among voltages across the plurality of current sources decreases to a bottom limit voltage, and that subsequently transits to an off level;

a frequency stabilization circuit structured to control the pulse modulator such that a frequency of the pulse signal approaches a target frequency;

a driver structured to drive a switching transistor of the switching converter according to the pulse signal; and a dummy load circuit structured to decrease the driving voltage in an enable state, to be set to the enable state when an off state of the switching transistor continues for a predetermined time, and to be set to a disable state in response to a next turn-on of the switching transistor.

Clause 2. The lighting circuit according to clause 1, wherein the dummy load circuit comprises:

a discharge switch provided between an output terminal of the switching converter and a ground; and a discharge control circuit structured to generate a discharge instruction signal which is an instruction to turn on and off the discharge switch.

Clause 3. The lighting circuit according to clause 2, wherein the discharge control circuit comprises a timer circuit structured to assert a discharge start signal when an interval at which the switching transistor is turned on is longer than the predetermined time, and wherein the discharge instruction signal is generated according to the discharge start signal.

Clause 4. The lighting circuit according to clause 1, wherein the pulse modulator switches the pulse signal to an off level after an on time elapses after the switching transistor is turned on, and wherein the on time is feedback controlled such that a frequency of the pulse signal approaches the target frequency.

Clause 5. The lighting circuit according to clause 4, wherein the pulse modulator comprises:

a plurality of comparators that correspond to the plurality of current sources, and that are each structured to compare a voltage across the corresponding current source with the bottom limit voltage;

a logic gate structured to combine output signals of the plurality of comparators into a single signal so as to generate a turn-on signal; and a pulse generator structured to generate a pulse signal that transits to an on level according to the turn-on signal, and that transits to an off level after the on time elapses.

Clause 6. The lighting circuit according to clause 5, structured to be switchable between (i) a first mode in which the switching transistor is driven according to the pulse signal and (ii) a second mode in which the switching transistor is driven according to the turn-on signal in a state in which the pulse generator is bypassed.

Clause 7. The lighting circuit according to clause 6, wherein the dummy load circuit is disabled in the second mode.

Clause 8. The lighting circuit according to clause 1, wherein the plurality of light-emitting elements and the plurality of current sources are configured in the form of a module.

Clause 9. An automotive lamp comprising the lighting circuit according to clause 1.

Clause 10. A control circuit for a step-down converter comprising a switching transistor, the control circuit comprising:

a pulse modulator that comprises a comparator structured to compare a feedback signal indicative of an electrical state of the step-down converter or a load thereof with a bottom limit voltage, and that is structured to generate a pulse signal that transits to an on level in response to a turn-on signal based on an output of the comparator;

a frequency stabilization circuit structured to control the pulse modulator such that a frequency of the pulse signal approaches a target frequency; and a dummy load circuit structured to forcibly decrease an output voltage of the step-down converter in an enable state, to be set to the enable state when an off state of the switching transistor continues for a predetermined time, and to be set to a disable state in response to a next turn-on of the switching transistor.

Clause 11. The control circuit according to clause 10, wherein the load comprises a light-emitting element and a current source coupled in series, and wherein the feedback signal is configured as a voltage across the current source.

Clause 12. The control circuit according to clause 10, wherein the dummy load circuit comprises:

a discharge switch provided between an output terminal of the step-down converter and a ground; and a discharge control circuit structured to generate a discharge instruction signal, which is an instruction to turn on and off the discharge switch.

Clause 13. The control circuit according to clause 12, wherein the discharge control circuit comprises a timer circuit structured to assert a discharge start signal when an interval at which the switching transistor is turned on is longer than the predetermined time, and wherein the discharge instruction signal is generated according to the discharge start signal.

Clause 14. The control circuit according to clause 10, wherein the pulse modulator comprises a pulse generator structured to generate the pulse signal that transits to an on level in response to the turn-on signal, and that transits to an off level after an on time elapses, and wherein the frequency stabilization circuit controls the on time such that a frequency of the pulse signal approaches the target frequency.

What is claimed is:

1. A lighting circuit structured to drive a plurality of light-emitting elements, the lighting circuit comprising:
    a plurality of current sources to be respectively coupled in series to corresponding light-emitting elements;
    a step-down switching converter structured to supply a driving voltage across both ends of each of a plurality of series connection circuits formed of the plurality of light-emitting elements and the plurality of current sources;
    a pulse modulator including at least one comparator, wherein the pulse modulator is structured to generate a turn-on signal, wherein the turn-on signal has a first level when a smallest voltage from among voltages across the plurality of current sources is lower than a bottom limit voltage, and the turn-on signal has a second level when the smallest voltage is higher than the bottom limit voltage, and wherein the pulse modulator is structured to generate a pulse signal ($S_p$) that transits to an on level when the turn-on signal transits from the second level to the first level, and that subsequently transits to an off level; and
    a frequency stabilization circuit structured to control the pulse modulator such that a frequency of the pulse signal approaches a target frequency,
    wherein, in a first mode, a switching transistor of the switching converter turns on when the pulse signal has the on level and the switching transistor turns off when the pulse signal has the off level,
    and wherein, in a second mode, the switching transistor turns on when the turn-on signal has the first level and the switching transistor turns off when the turn-on signal has the second level.

2. The lighting circuit according to claim 1, wherein the plurality of light-emitting elements and the plurality of current sources are configured in the form of a module.

3. An automotive lamp comprising the lighting circuit according to claim 1.

4. A lighting circuit structured to drive a plurality of light-emitting elements, the lighting circuit comprising:
    a plurality of current sources to be respectively coupled in series to corresponding light-emitting elements;
    a step-down switching converter structured to supply a driving voltage across both ends of each of a plurality of series connection circuits formed of the plurality of light-emitting elements and the plurality of current sources;
    a pulse modulator structured to generate a turn-on signal indicative of a result of comparison between a bottom limit voltage and a smallest voltage from among voltages across the plurality of current sources, and to generate a pulse signal that transits to an on level in response to the turn-on signal, and that subsequently transits to an off level; and
    a frequency stabilization circuit structured to control the pulse modulator such that a frequency of the pulse signal approaches a target frequency,
    wherein, in a first mode, a switching transistor of the switching converter is driven according to the pulse signal,
    and wherein, in a second mode, the switching transistor is driven according to the turn-on signal, and
    wherein the lighting circuit further comprises:
    a mode selector structured to generate a mode selection signal according to an operating state of the lighting circuit;
    a multiplexer structured to receive the pulse signal and the turn-on signal, and to select one from among them that corresponds to the mode selection signal; and
    a driver structured to drive the switching transistor according to an output of the multiplexer.

5. The lighting circuit according to claim 4, wherein, in a steady state in which the lighting circuit operates stably, the mode selector selects a first mode,
    and wherein, in an at least one situation from among a situation immediately after the lighting circuit is started up and a situation in which a sudden load fluctuation occurs, the mode selector selects a second mode.

6. The lighting circuit according to claim 4, wherein the mode selector comprises a comparator structured to compare an output voltage of the switching converter with a predetermined threshold voltage,
    and wherein, when the output voltage is higher than the predetermined threshold voltage, the mode selector selects the first mode,
    and wherein, when the output voltage is lower than the predetermined threshold voltage, the mode selector selects the second mode.

7. The lighting circuit according to claim 4, wherein the mode selector selects the mode based on the turn-on signal.

8. The lighting circuit according to claim 7, wherein, when the turn-on signal has a pulse width that is shorter than a predetermined threshold value, the mode selector selects the first mode,
    and wherein, when the turn-on signal has a pulse width that is longer than a predetermined threshold value, the mode selector selects the second mode.

9. A lighting circuit structured to drive a plurality of light-emitting elements, the lighting circuit comprising:
    a plurality of current sources to be respectively coupled in series to corresponding light-emitting elements;
    a step-down switching converter structured to supply a driving voltage across both ends of each of a plurality of series connection circuits formed of the plurality of light-emitting elements and the plurality of current sources;
    a pulse modulator structured to generate a turn-on signal indicative of a result of comparison between a bottom limit voltage and a smallest voltage from among voltages across the plurality of current sources, and to generate a pulse signal that transits to an on level in response to the turn-on signal, and that subsequently transits to an off level; and
    a frequency stabilization circuit structured to control the pulse modulator such that a frequency of the pulse signal approaches a target frequency,
    wherein, in a first mode, a switching transistor of the switching converter is driven according to the pulse signal,
    and wherein, in a second mode, the switching transistor is driven according to the turn-on signal, and
    wherein the lighting circuit further comprises:
    a dummy load circuit structured to decrease the driving voltage in an enable state, to be set to the enable state when an off state of the switching transistor continues for a predetermined time, and to be set to a disable state in response to a next turn-on of the switching transistor,
wherein the dummy load circuit is disabled in the second mode.

10. A lighting circuit structured to drive a plurality of light-emitting elements, the lighting circuit comprising:
a plurality of current sources to be respectively coupled in series to corresponding light-emitting elements;
a step-down switching converter structured to supply a driving voltage across both ends of each of a plurality of series connection circuits formed of the plurality of light-emitting elements and the plurality of current sources;
a pulse modulator structured to generate a turn-on signal indicative of a result of comparison between a bottom limit voltage and a smallest voltage from among voltages across the plurality of current sources, and to generate a pulse signal that transits to an on level in response to the turn-on signal, and that subsequently transits to an off level; and
a frequency stabilization circuit structured to control the pulse modulator such that a frequency of the pulse signal approaches a target frequency,
wherein, in a first mode, a switching transistor of the switching converter is driven according to the pulse signal,
and wherein, in a second mode, the switching transistor is driven according to the turn-on signal,
wherein, after an on time elapses after the switching transistor is turned on, the pulse modulator switches the pulse signal to the off level,
and wherein the on time is feedback controlled such that a frequency of the pulse signal approaches the target frequency.

11. A lighting circuit structured to drive a plurality of light-emitting elements, the lighting circuit comprising:
a plurality of current sources to be respectively coupled in series to corresponding light-emitting elements;
a step-down switching converter structured to supply a driving voltage across both ends of each of a plurality of series connection circuits formed of the plurality of light-emitting elements and the plurality of current sources;
a pulse modulator structured to generate a turn-on signal indicative of a result of comparison between a bottom limit voltage and a smallest voltage from among voltages across the plurality of current sources, and to generate a pulse signal that transits to an on level in response to the turn-on signal, and that subsequently transits to an off level; and
a frequency stabilization circuit structured to control the pulse modulator such that a frequency of the pulse signal approaches a target frequency,
wherein, in a first mode, a switching transistor of the switching converter is driven according to the pulse signal,
and wherein, in a second mode, the switching transistor is driven according to the turn-on signal,
wherein the pulse modulator comprises:
a plurality of comparators that correspond to the plurality of current sources, and that are each structured to compare a voltage across the corresponding current source with the bottom limit voltage;
a logic gate structured to combine output signals of the plurality of comparators into a single signal so as to generate a turn-on signal; and
a pulse generator structured to generate a pulse signal that transits to an on level according to the turn-on signal, and that transits to an off level after the on time elapses.

12. A control circuit for a switching converter comprising a switching transistor, the control circuit comprising:
a pulse modulator that comprises a comparator structured to compare a feedback signal indicative of an electrical state of the switching converter or a load of the switching converter with a bottom limit voltage, and that is structured to generate a pulse signal that transits to an on level in response to a turn-on signal based on an output of the comparator;
a frequency stabilization circuit structured to control the pulse modulator such that a frequency of the pulse signal approaches a target frequency;
a mode selector structured to generate a mode selection signal according to an operating state of the switching converter;
a multiplexer structured to receive the pulse signal and the turn-on signal, to select the pulse signal when the mode selection signal indicates a first mode, and to select the turn-on signal when the mode signal indicates a second mode; and
a driver structured to drive the switching transistor according to an output of the multiplexer.

13. The control circuit according to claim 12, wherein the load comprises a light-emitting element and a current source coupled in series,
and wherein the feedback signal is configured as a voltage across the current source.

14. The control circuit according to claim 12, wherein, in a steady state in which the switching converter operates stably, the mode selector selects the first mode,
and wherein, in an at least one situation from among a situation immediately after the switching converter is started up and a situation in which a sudden load fluctuation occurs, the mode selector selects the second mode.

15. The control circuit according to claim 12, wherein the mode selector comprises a comparator structured to compare an output voltage of the switching converter with a predetermined threshold voltage,
and wherein, when the output voltage is higher than the predetermined threshold voltage, the mode selector selects the first mode,
and wherein, when the output voltage is lower than the predetermined threshold voltage, the mode selector selects the second mode.

16. The control circuit according to claim 12, wherein the mode selector selects the mode based on the turn-on signal.

* * * * *